(12) United States Patent
Hepner et al.

(10) Patent No.: US 8,578,861 B2
(45) Date of Patent: *Nov. 12, 2013

(54) CARRIAGE TRACTION VEHICLE

(76) Inventors: Alan Hepner, Rexford, MT (US); David Metivier, Holladay, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,227

(22) Filed: Feb. 14, 2012

(65) Prior Publication Data

US 2012/0137923 A1 Jun. 7, 2012

Related U.S. Application Data

(63) Continuation of application No. 12/471,103, filed on May 22, 2009, now Pat. No. 8,113,125.

(60) Provisional application No. 61/128,623, filed on May 23, 2008.

(51) Int. Cl.
*B61B 13/04* (2006.01)

(52) U.S. Cl.
USPC .......................................... 105/141; 104/118

(58) Field of Classification Search
USPC .......... 104/118–121; 105/141, 142, 144, 145, 105/148–150
See application file for complete search history.

(56) References Cited

U.S. PATENT DOCUMENTS

| | | |
|---|---|---|
| 1,838,204 A | 12/1931 | Wood |
| 3,610,166 A | 10/1971 | Ellzey |
| 3,891,062 A | 6/1975 | Geneste |
| 4,026,388 A | 5/1977 | Creissels |
| 4,534,451 A | 8/1985 | Peter |
| 4,602,567 A | 7/1986 | Hedström |
| 4,627,517 A | 12/1986 | Bor |
| 4,791,871 A | 12/1988 | Mowll |
| 4,821,845 A | 4/1989 | DeViaris |
| 5,069,141 A | 12/1991 | Ohara et al. |
| 5,231,933 A | 8/1993 | DiRosa |
| 5,372,072 A | 12/1994 | Hamy |
| 5,419,260 A | 5/1995 | Hamilton |
| 5,709,154 A | 1/1998 | Schott |
| 5,957,056 A | 9/1999 | Behar |
| 5,964,159 A | 10/1999 | Hein |
| 6,053,286 A | 4/2000 | Balmer |
| 6,321,657 B1 | 11/2001 | Owen |
| 6,431,078 B2 | 8/2002 | Serrano |
| 6,450,103 B2 | 9/2002 | Svensson |
| 6,666,147 B1 | 12/2003 | Minges |
| 6,739,430 B2 | 5/2004 | Hill |
| 7,334,524 B2 | 2/2008 | Roane |
| 8,113,125 B2 * | 2/2012 | Hepner et al. ................ 105/141 |
| 2001/0037747 A1 | 11/2001 | Svensson |
| 2004/0168605 A1 | 9/2004 | Minges |
| 2008/0066241 A1 | 3/2008 | Evans |

FOREIGN PATENT DOCUMENTS

| | | |
|---|---|---|
| EP | 0541731 B1 | 8/1997 |
| WO | 9118777 A1 | 12/1991 |

* cited by examiner

*Primary Examiner* — R.J. McCarry, Jr.
(74) *Attorney, Agent, or Firm* — Paul C. Oestreich; Eminent IP, P.C.

(57) ABSTRACT

The invention is a carriage traction vehicle for use with a monorail. The vehicle is self-propelled along the monorail by one or more motors engaging a fixed rack attached to the monorail. The carriage traction vehicle may include one or more of the following features: a cabin, a counterwheel assembly, a platform assembly, a leveling control system, a motor system, a tilt mechanism, and a safety assembly.

23 Claims, 21 Drawing Sheets

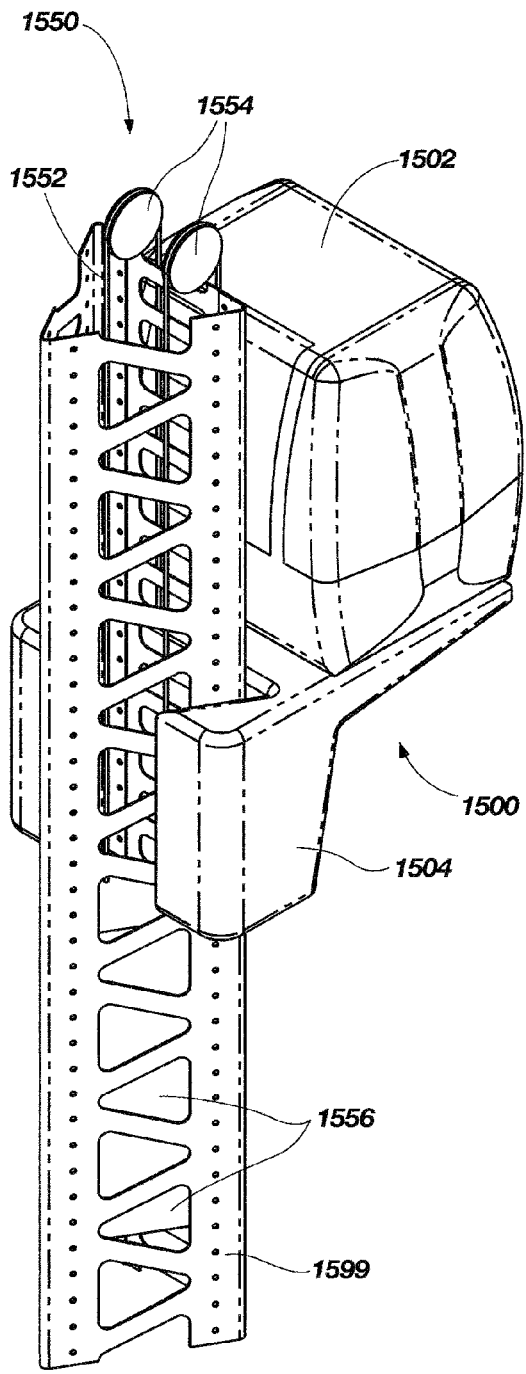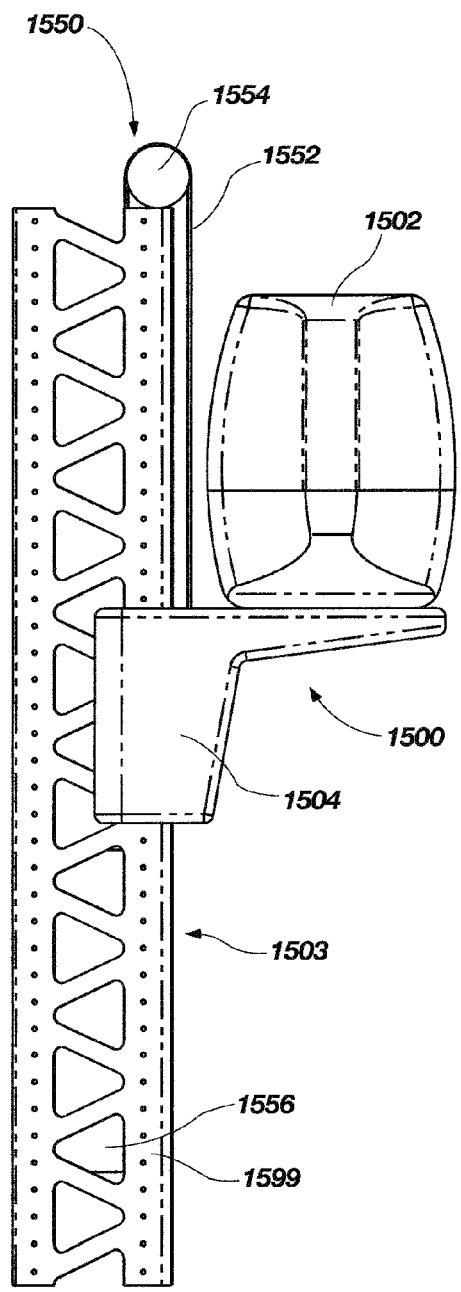
FIG. 15A  FIG. 15B

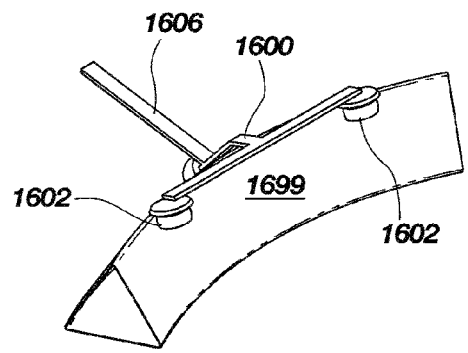 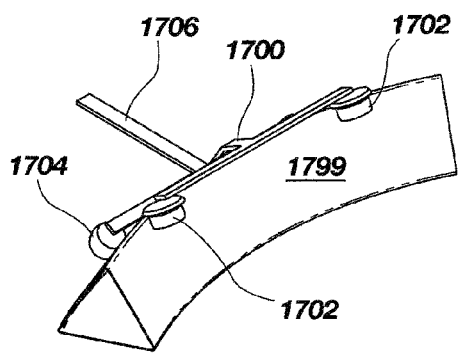
FIG. 16A  FIG. 17A
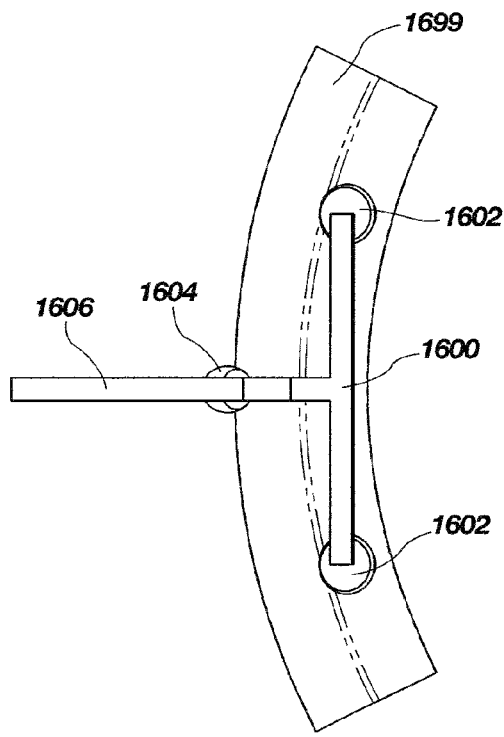 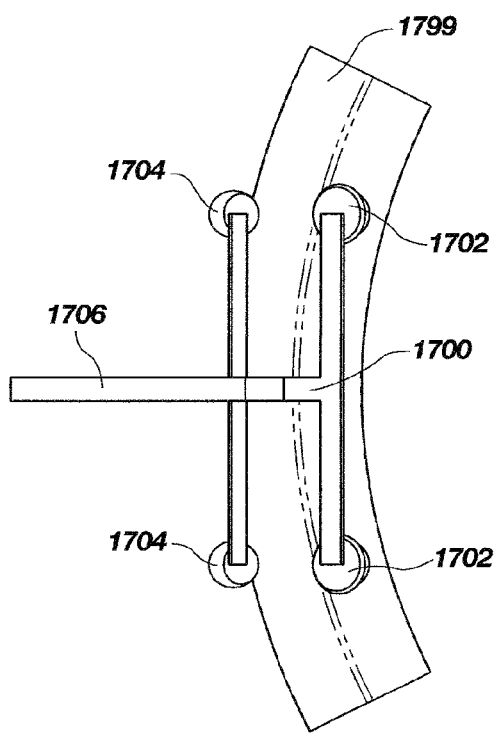
FIG. 16B  FIG. 17B
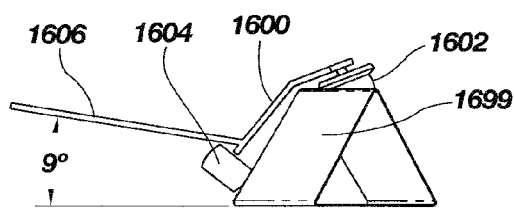 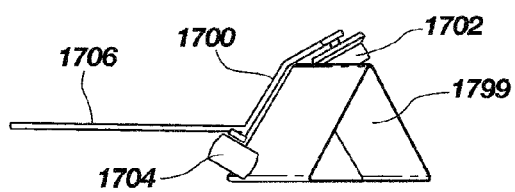
FIG. 16C  FIG. 17C

CARRIAGE TRACTION VEHICLE

CROSS-REFERENCE TO RELATED APPLICATIONS

This is a continuation patent application of nonprovisional patent application Ser. No. 12/471,103, filed May 22, 2009, titled "CARRIAGE TRACTION VEHICLE", issued, Feb. 14, 2012, which in turn claims priority to U.S. provisional patent application No. 61/128,623, filed May 23, 2008, titled "TRIANGLE CARRIAGE TRACTION VEHICLE", expired. The contents of application Ser. Nos. 12/471,103 and 61/128,623 are expressly incorporated by reference for all purposes as if fully set forth herein.

BACKGROUND OF THE INVENTION

1. Field of the Invention

This invention relates generally to a vehicle for use in railed transportation systems. More particularly, the invention relates to a self-powered vehicle configured for operation on a monorail.

2. Description of Related Art

Railed transportation systems are well known in the art. Most conventional railways for transportation of people, goods and other resources rely on friction between the drive wheels and rails. Such conventional rail transportation systems may not be suitable for use on steep grades where traction may become a problem. To compensate for the lack of necessary friction, various elaborate multiple-wheeled and spring-loaded friction-based rail transportation systems have been devised, such as those described in U.S. Pat. No. 4,602,567 to Hedström, U.S. Pat. No. 5,069,141 to Ohara et al., U.S. Pat. No. 5,231,933 to DiRosa, U.S. Pat. No. 5,419,260 to Hamilton, U.S. Pat. No. 5,964,159 to Hein, U.S. Pat. No. 6,053,286 to Balmer, U.S. Pat. No. 6,666,147 to Minges and U.S. Patent Application Publication No. 2004/0168605 to Minges. However, these systems are inherently complex mechanical systems.

For applications where steep grades are the norm, railed transportation systems may rely on a toothed rack rail, usually between the running rails in a system known variously as a "cog railway", a "rack-and-pinion railway" or simply, "rack railway". Trains operated on a rack railway are generally fitted with one or more cogwheels or pinions that mesh with the rack rail for driving the train along the track. However, such rack railway systems suffer from derailments when the cogwheel slips out of the teeth in the rail rack. Additionally, the rail rack itself is expensive to produce and maintain. Furthermore, switches for rack railways are more complex because of the rail rack.

Alternative approaches to railed transportation systems for steep gradients may rely on other drive mechanisms such as cables and chain-driven systems to pull a car up a track, or to lower it down a track on a steep incline. Examples of conventional cable-driven railed transportation systems include U.S. Pat. No. 3,891,062 to Geneste, U.S. Pat. No. 4,026,388 to Creissels, U.S. Pat. No. 4,534,451 to Peter, U.S. Pat. No. 4,821,845 to DeVaiaris and U.S. Pat. No. 6,739,430 to Hill. Examples of chain-drive mechanisms for railed transportation are disclosed in U.S. Pat. No. 1,838,204 to Wood and U.S. Pat. No. 4,627,517 to Bor. While these cable and chain-driven systems tend to be simpler than the friction-based systems for inclined applications, they do not lend themselves well to applications that include turns and changes in inclination because of the nature of cable and chain-driven drives. More specifically, it is difficult to configure a chain or cable for driving a car over a track having turns and changes in inclination because the force exerted by a chain or cable is linear in nature, thus requiring pulleys and chain wheels for redirection.

Thus, there exists a need in the art for a vehicle that may be independently driven with an electrical motor and that is capable of being used with monorail tracks having a rack for drive traction. It would be advantageous to have such a rail car formed of high strength, lightweight materials. It would also be advantageous to have a rail car capable of self-leveling to adjust for braking, vertical changes and banking into curves.

SUMMARY OF THE INVENTION

Embodiments of a vehicle for transporting a payload along a monorail are disclosed. According to one embodiment, the vehicle may include a cabin configured for carrying the payload. The embodiment of a vehicle may further include a counterwheel assembly configured for wheeled engagement around the monorail, the monorail configured with a triangular cross-section. The embodiment of a vehicle may further include a platform assembly configured for supporting the cabin, and may further include a cabin axle rotationally connected to the counterwheel assembly. The embodiment of a vehicle may further include a leveling control system attached to the platform assembly and in rotational communication with the cabin axle. The embodiment of a vehicle may further include a motor system mounted to the counterwheel assembly for driving the vehicle along the monorail.

BRIEF DESCRIPTION OF THE DRAWINGS

To further clarify the advantages and features of the present invention, a more particular description of the invention will be rendered by reference to specific embodiments thereof that are illustrated in the appended drawings. It will be appreciated that these drawings depict only typical or exemplary embodiments of the invention and are therefore not to be considered limiting of the scope of the invention. The invention will be described and explained with additional specificity and detail using the accompanying drawings.

FIGS. 15A and 15B are rear perspective and side views of an embodiment of vertical tower vehicle according to the present invention.

FIGS. 16A-16C are perspective, top and monorail centerline views of an embodiment of a carriage assembly having two outside support wheels, a centrally located inside support wheel under a platform during an outside curve according to the present invention.

FIGS. 17A-17C are perspective, top and monorail centerline views of an embodiment of a carriage assembly having two outside support wheels, two inside support wheels under a platform during an outside curve according to the present invention.

DETAILED DESCRIPTION OF THE INVENTION

Reference will now be made to figures of embodiments of the present invention wherein like structures will be provided with like reference designations. It is understood that the drawings are diagrammatic and schematic representations of exemplary embodiments of the present invention and are neither limiting of the present invention nor are they necessarily drawn or shown to scale.

The Illustrated embodiments of the present invention include a carriage traction vehicle configured for use on a triangular cross-sectioned monorail. An example of such a monorail is disclosed in U.S. Pat. No. 8,066,200 to Hepner at al., the contents of which are expressly incorporated by reference for all purposes as if fully set forth herein. The embodiments of a vehicle disclosed herein are useful for transporting any kind of payload, e.g., passengers, bulk items and/or cargo, from one location to another in a transportation system. While some of the illustrated embodiments of a vehicle are well suited for transporting passengers, it will be evident that there are many other applications for such a vehicle, e.g., transporting bulk materials such as ore, coal, grain, chemicals, etc. in industrial applications, and automated transportation of goods in material handling systems for warehouses.

Figure 1A:
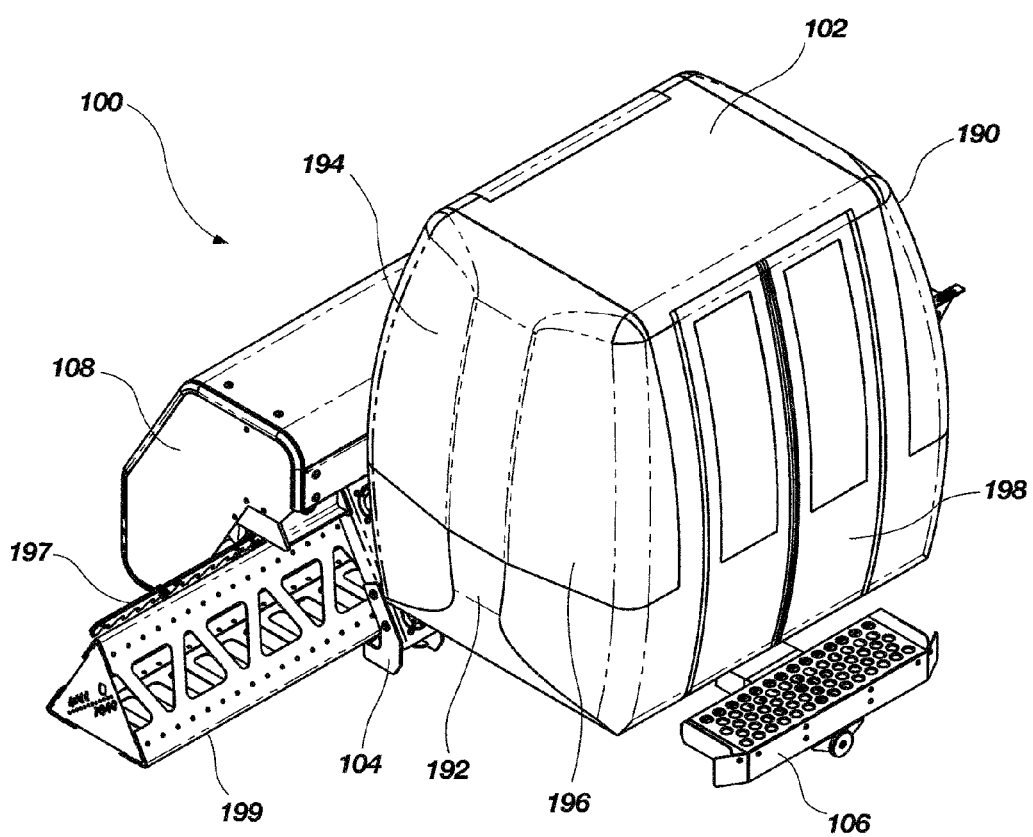
FIG. 1A is a perspective view of an embodiment of a triangle carriage traction vehicle according to the present invention.

FIG. 1A is a perspective view of an embodiment of a triangle carriage traction vehicle 100 according to the present invention. Vehicle 100 may include a cabin 102, counterwheel assembly 104, platform assembly 106 and battery-powered electrical motor system 108. Though the illustrated embodiment includes a battery-powered electrical motor system 108, it will be understood that other embodiments may include an electrification rail to obviate the use of battery power, or gasoline or diesel or other fossil fuel powered engines with modifications for same as will be readily understood by one of ordinary skill in the art. Vehicle 100 is configured for traversing a triangular cross-sectioned monorail 199 of any suitable length.

Cabin 102 may be a personnel carrier configured to carry passengers and/or cargo (neither shown in FIG. 1A). Cabin 102 may include doors 198 (as shown in FIG. 1A) for side loading and unloading of passengers and cargo from a laterally placed station platform (not shown). The cabin 102 may include seating 196 for passenger convenience or safety, a transparent canopy 194 for viewing outside and allowing ambient light within the cabin, climate control, i.e., heating and/or air conditioning and recirculation (not shown) for passenger comfort, vehicle controls (not shown) for use by one or more passengers or a captain of the cabin, and communications equipment (not shown) for wired or wireless communications with vehicle stations or any other location.

According to the embodiment shown in FIG. 1A, the cabin 102 may be side-mounted in a cantilevered configuration relative to monorail 199. This cantilevered configuration provides positive weight loading on the counterwheel assembly 104 when the cabin is empty or when it is loaded. Positive weight loading eliminates bounce associated with other conventional monorail carriage designs. The side-mounted cantilevered configuration of the cabin 102 is further advantageous because it facilitates either "end" or "side" loading and unloading with a single cabin alignment. In an "end" loading and unloading configuration, doors (such as 198) may be placed at both the front 190 and back 192 of the cabin 102 to allow for loading and unloading at a base station and end station.

According to an alternative embodiment, the cabin 102 may be mounted above the monorail 199 to allow for loading and unloading to occur from either side (or both sides with dual doors 198) of the monorail 199. Though side-loading and unloading of cabin 102 is illustrated in FIG. 1A, it will be evident that an alternative embodiment could accommodate end-loading of cabin 102 with doors on opposite sides.

Figure 1B:
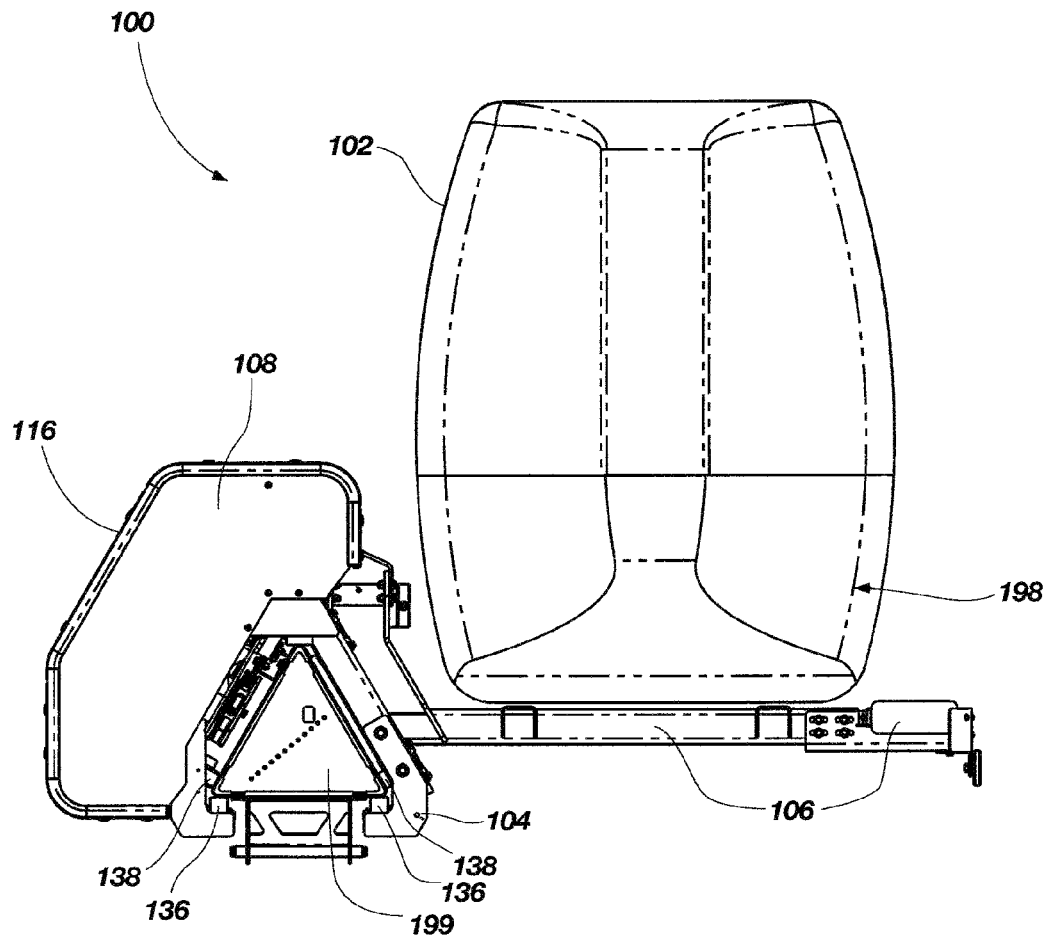
FIG. 1B is a rear view of the embodiment of a triangle carriage traction vehicle shown in FIG. 1A.

FIG. 1B is a rear view of the embodiment of a triangle carriage traction vehicle 100 shown in FIG. 1A. As shown in FIG. 1B, cabin 102 rests on platform assembly 106. According to one embodiment, the platform assembly 106 may be rotationally mounted to the counterwheel assembly 104 to allow the cabin 102 to level when going over uneven terrain. The rotational mounting of the platform assembly 106 to the counterwheel assembly 104 is further illustrated and explained with reference to FIGS. 3 and 4 below. The counterwheel assembly 104 surrounds and rolls along monorail 199 under the power of the battery-powered electrical motor system 108. A motor cover 116 encloses the battery-powered electrical motor system 108.

Figure 1C:
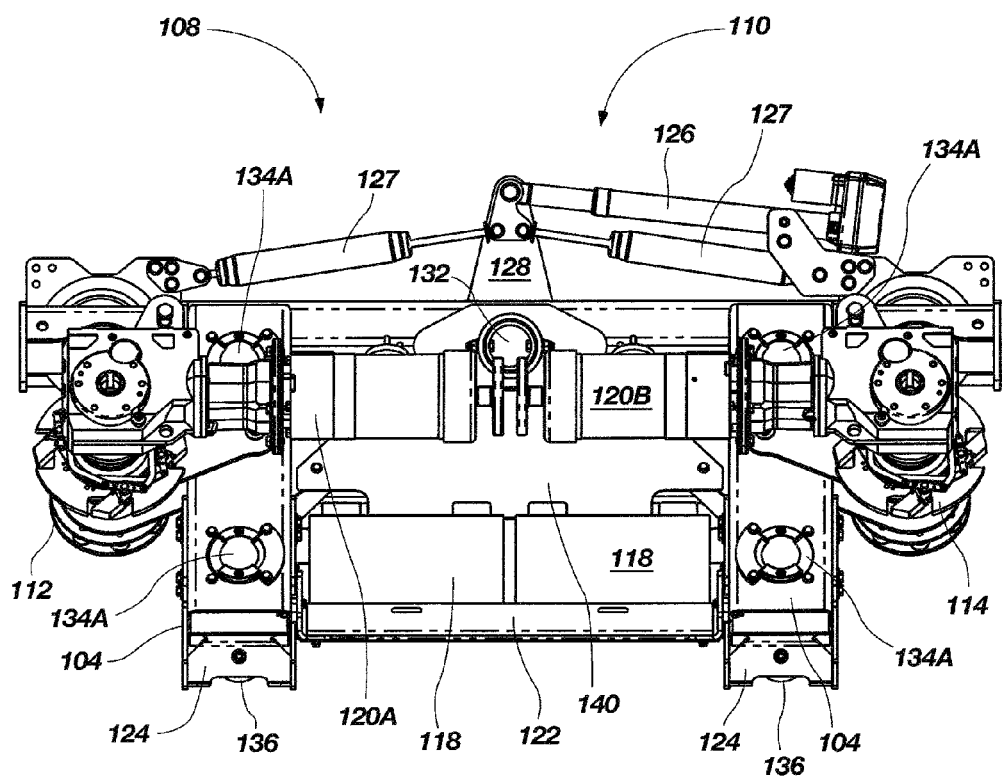
FIG. 1C is a front view of an embodiment of a battery-powered electrical motor system with the motor cover removed and a counterwheel assembly according to the present invention.

FIG. 1C is a front view of an embodiment of a battery-powered electrical motor system, shown generally at 108, with the motor cover 116 (FIG. 1B) removed. FIG. 1C also illustrates an embodiment of a counterwheel assembly 104. The embodiment of motor system 108 shown in FIG. 1C further illustrates dual redundant electrical motors, namely, left drive assembly 112 and right drive assembly 114. The dual redundant electrical motors are provided as a safety and performance feature of vehicle 100. It will be understood that dual redundant drives, 112 and 114, are not a required feature of all embodiments of vehicle 100.

According to another embodiment of the invention, the cabin 102 (FIG. 1B) may be transported along monorail 199 (FIG. 1B) with a single electric motor or other power engine of sufficient power and torque. According to still another embodiment, movement of the cabin along monorail 199 may be achieved with a single power engine working in conjunction with an alternative power transmission method, e.g., belt, chain, etc. Such an embodiment with a single power engine and alternative power transmission method in communication with a second drive assembly may be configured to achieve the safety and performance required for a people mover application. Performance may be maintained in such a single motor embodiment by reducing the load on the single motor by sharing the load with a second drive roller assembly. However, the dual redundant electrical motors (left and right drive assemblies 112 and 114) of the illustrated embodiment of a triangle carriage traction vehicle 100 are a presently preferred embodiment because of the inherent safety achieved by the drive redundancy. The dual redundant drive assemblies 112 and 114 may also be configured with additional features including dual redundant over-speed safety, brake and drive engaged drive roller assembly, according to various embodiments of vehicle 100.

According to another embodiment, the triangle carriage traction vehicle 100 may include a mechanical over-speed using flyweights to enable braking action with electrical supervision acting on each drive roller assembly. The mechanical over-speed has an adjustable rate of braking for differing speeds and inclines. Additionally, the mechanical over-speed may be configured to work in each direction of travel and direction of the inclines. Furthermore, the mechanical over-speed has the capability to overcome the effects of gravity regardless of its orientation to the normal force of gravity. This allows the vehicle 100 to travel safely in all directions, inclines, and orientations.

According to one embodiment of vehicle 100, each drive assembly 112 and 114 may be configured with enough power and torque for independently driving the cabin 102 along monorail 199 (FIGS. 1A-B). Thus according to this embodiment, if one drive assembly 112 or 114 fails, the cabin 102 can still be driven along the monorail 199 to its destination or held safely in position for evacuation or repair. Motor system 108 may include one or more batteries 118 (two shown) supported on a battery carrier 122. The batteries 118 provide an electrical power source for driving the dual redundant electrical motors or drive assemblies 112 and 114. The left and right drive assemblies 112 and 114 are mechanically coupled to, and driven by their associated gearbox assemblies 120A and 120B. The left and right drive assemblies 112 and 114 are also coupled to pinion roller wheels (not shown in FIG. 1C) that may engage a rack having cycloid-shaped teeth (also not shown in FIG. 1C) which may be mounted to the monorail 199 (FIGS. 1A-B).

Referring again to FIG. 1C, the motor system 108 may be supported on the counterwheel assembly 104 by two triangle carriages 124. As shown in the illustrated embodiment, the triangle carriages 124 may be fixedly coupled to each other. According to an alternative embodiment (not shown), the two triangle carriages 124 may be adjustably coupled to each other in order to allow for a variable separation between the two triangle carriages 124. This variable separation embodiment may be useful when leveling the cabin 102 (FIGS. 1A-1B) during terrain changes or banking of the vehicle 100 during course changes. According to one embodiment, each triangle carriage 124 may be configured to support bottom wheels 136 (two visible in FIGS. 1B and 1C) that rest on surfaces of the monorail 199 (FIGS. 1A-B). The triangle carriages 124 may also support drive cartridges 134A (four shown) and cabin cartridges 134B (not shown in FIG. 1C) which in turn support wheels 138 (not shown in FIG. 1C, but see FIG. 1B) that roll on surfaces of the monorail 199. According to other embodiments, the triangle carriages 124 may further be configured with other structural elements to support the left and right drive assemblies 112 and 114, associated gearbox assemblies 120A and 120B, an inner cover 140, pinion roller wheels (not shown), batteries 118 (two shown), and a battery carrier 122 or combinations thereof.

Figure 1D:
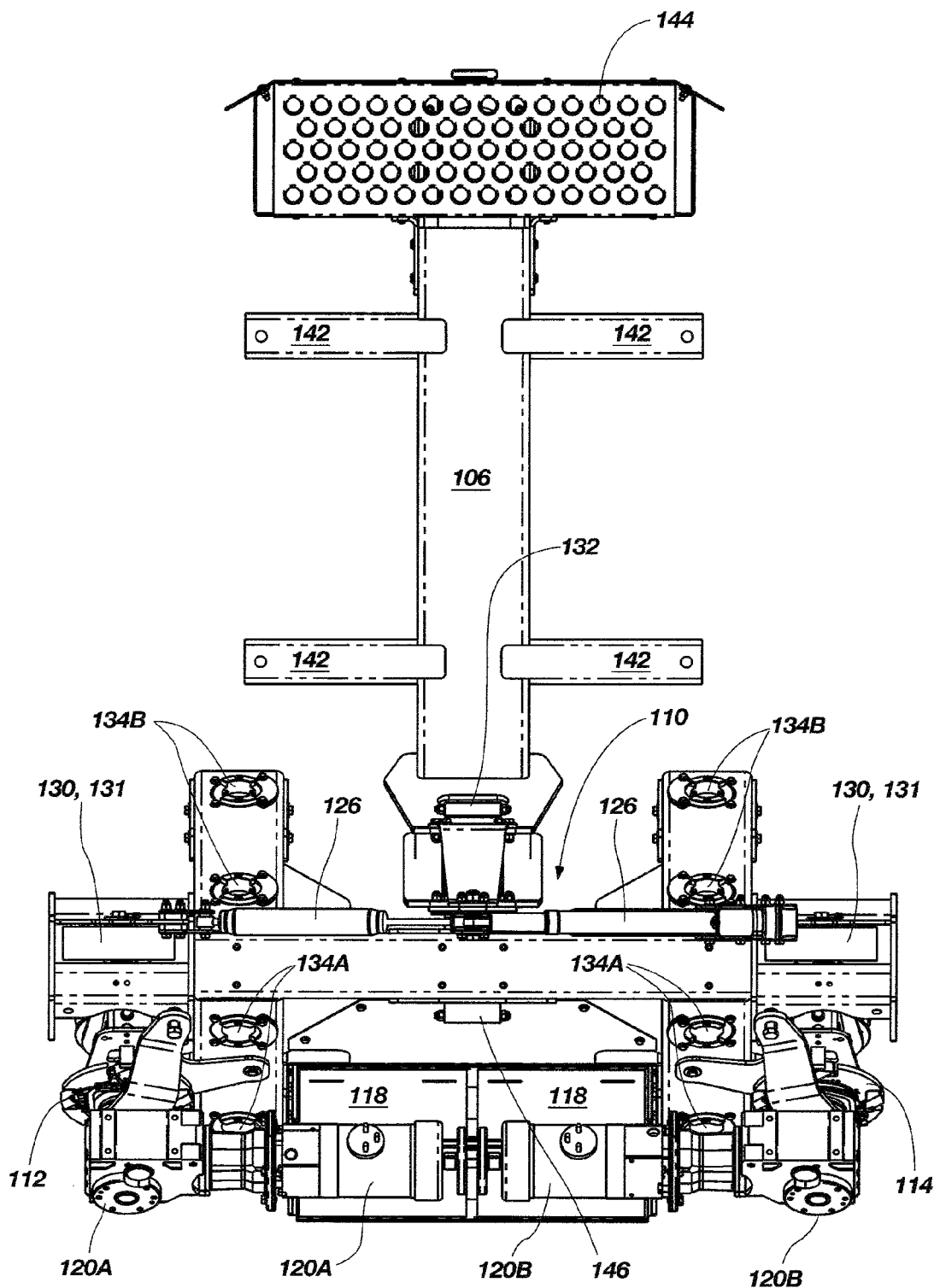
FIG. 1D is a top view of the embodiment of a triangle carriage traction vehicle shown in FIGS. 1A-B with the cabin and motor cover removed.

FIG. 1C also illustrates an embodiment of a tilt mechanism 110 suitable for use with vehicle 100. Embodiments of a tilt mechanism 110 may include one or more actuators 126 (one shown) and one or more shock absorbers 127 (two shown) configured for leveling of the cabin 102 (FIGS. 1A-1B) and banking of the cabin 102 to compensate for curves, inclines, declines, braking and acceleration. Embodiments of actuators 126 may be, for example, electric, hydraulic or pneumatic actuators 126. FIG. 1C illustrates one actuator 126 and two shock absorbers 127 that are mechanically coupled to an arm 128 of the platform assembly 106 (FIGS. 1A-B and 1D). Under computer control (not shown), the actuator 126 moves the arm 128 to selectively rotate the relative position of the cabin 102 about cabin axle 132. The particular embodiment of a tilt mechanism 110 illustrated in FIG. 1C is capable of rotating the cabin 102 approximately 25° up or down relative to a centerline of the monorail 199.

Such selective movement or leveling may be used to compensate for acceleration, deceleration and/or leveling of the floor of the cabin 102 over sloped terrain upon which the monorail 199 traverses. This selective leveling feature of the present invention provides significantly improved passenger comfort over variable terrain, particularly mountains. Furthermore, this selective leveling feature in embodiments of vehicle 100 allows the monorail 199 to follow the terrain over which it is constructed without the added cost of a monorail 199 having expanded truss supports to linearize, or otherwise smooth, the cabin 102 path. It will be understood that other embodiments of a tilt mechanism 110 may be capable of fully rotating a cantilevered, side-mounted cabin 102, for example and not be way of limitation, in the context of an amusement park ride vehicle.

FIG. 1D is a top view of selected portions of the triangle carriage traction vehicle shown in FIGS. 1A-B with the cabin 102 and motor cover 116 removed for better illustration. FIG. 1D shows platform assembly 106, left 112 and right 114 drive assemblies, left and right gearbox assemblies 120A and 120B, tilt mechanism 110 with actuators 126 (two shown in FIG. 1D), batteries 118, cabin axle 132, drive cartridges 134A and 134B (all eight of them), carriage weldment 146, and two support wheel assemblies 130. Each support wheel assembly 130 may include a support wheel 131 that rests on the crown of the monorail 199. FIG. 1D further illustrates mounting rails 142 upon which the cabin 102 (not shown) may be mounted, and a step 144, used by passengers entering and exiting the cabin 102.

It will be understood that other embodiments of a vehicle (not illustrated) according to the present invention may be configured without support wheels 131 that rest on the crown of the monorail 199. In still other embodiments (not illustrated), the vehicle may be configured for use with a triangular cross-sectioned monorail wherein the monorail has been rotated 30° along a centerline so that one of the three faces of the triangular cross-sectioned monorail 199 is vertical with the cabin 102 cantilevered out over the vertical side. This configuration may improve clearance for the cabin 102 rotation, shorten the moment of the weight in the cabin and improve span capability of such a vehicle configuration. It will, of course, be understood that other orientations of a triangular cross-sectioned monorail 199 may also be suitable for use with various configurations of vehicle 100. Furthermore, it will be readily apparent that other types of monorails, e.g., those having arbitrary cross-sectional profiles, may be used with a suitable configuration of vehicle 100.

The following discussion will provide further detail regarding the subsystems and components of the illustrated embodiment of vehicle 100. The Appendix of the U.S. provisional patent application No. 61/128,623, filed May 23, 2008, titled "TRIANGLE CARRIAGE TRACTION VEHICLE", includes full engineering drawings related to an embodiment of vehicle 100. Those engineering drawings in combination with the detailed description herein provide an enabling written description of vehicle 100 sufficient for one of ordinary skill in the art to understand and practice the present invention. It will be appreciated that various other embodiments of the present invention will be readily apparent in view of these engineering drawings and the added description herein. The vehicle 100 described herein may be used, for example and not by way of limitation, on the monorail disclosed in U.S. Pat. No. 8,066,200 to Hepner at al.

Figure 2A:
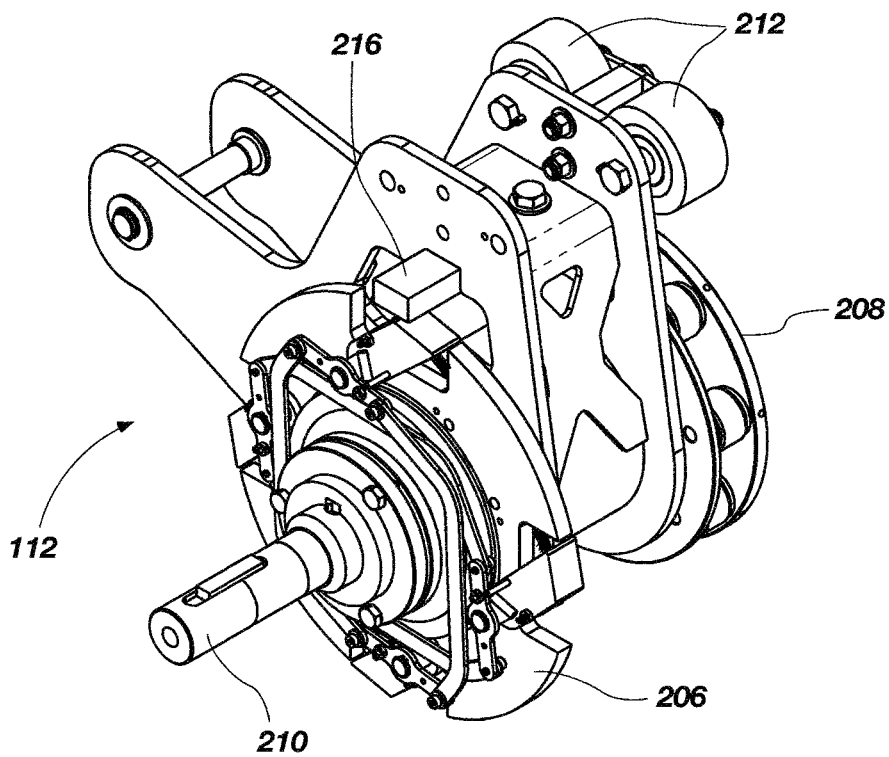
FIG. 2A is a perspective drawing of an embodiment of a left drive assembly according to the present invention.
Figure 2B:
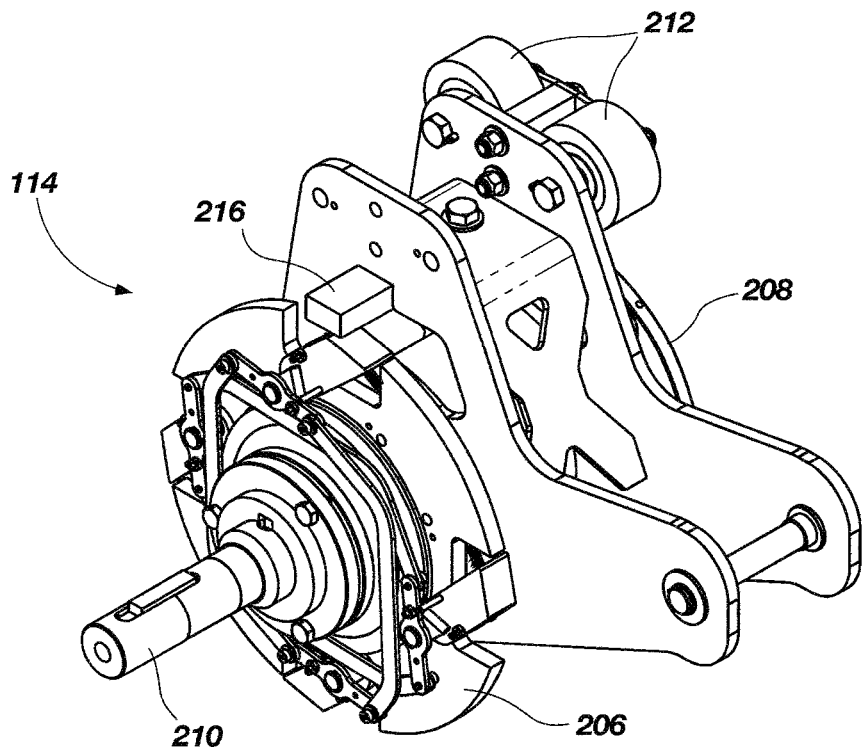
FIG. 2B is a perspective drawing of an embodiment of a right drive assembly according to the present invention.

FIG. 2A is a perspective drawing of an embodiment of a left drive assembly 112 according to the present invention. FIG. 2B is a perspective drawing of an embodiment of a right drive assembly 114 according to the present invention. It will be readily apparent that the drive assemblies 112 and 114 have significant symmetry, thus, additional drawing FIGS. 2C-2E will detail the left drive assembly 112, only. More particularly, FIGS. 2C-2E are drawings of front, right side and top views, respectively, of an embodiment of a left drive assembly 112 suitable for a vehicle 100 according to the present invention.

Figure 2C:
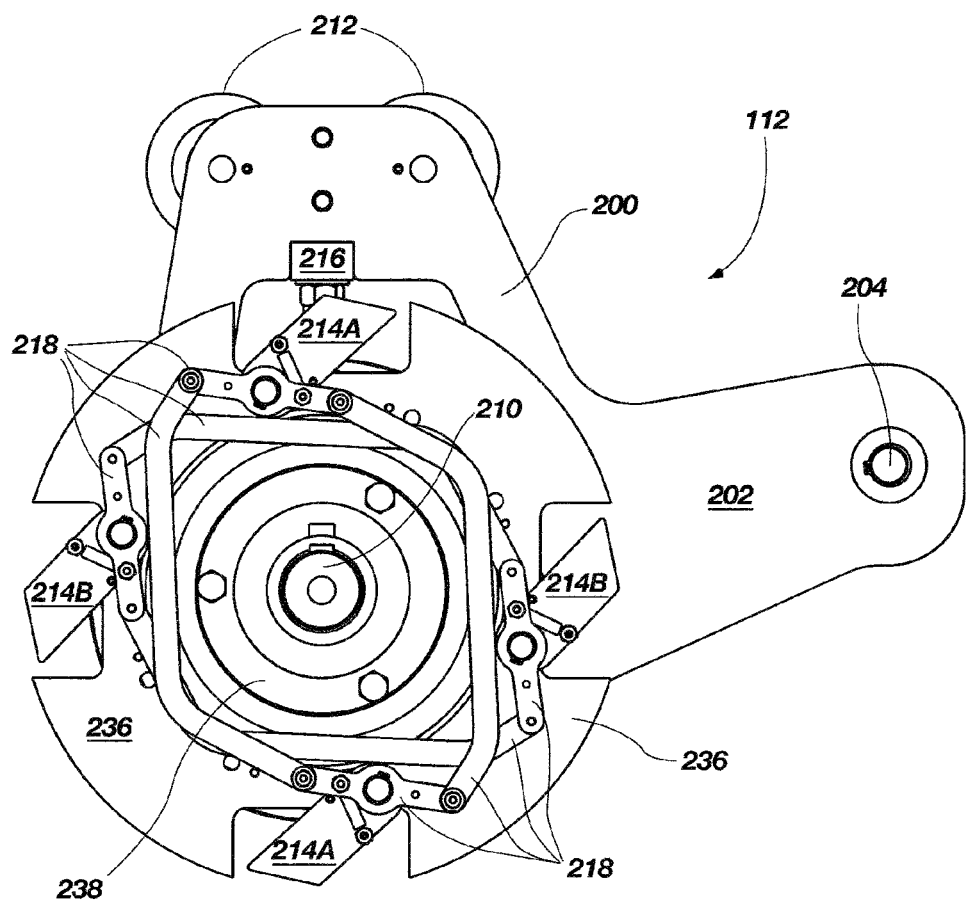
FIGS. 2C-2E are drawings of front, right side and top views, respectively, of an embodiment of a left drive assembly suitable for a vehicle according to the present invention.
Figure 2D:
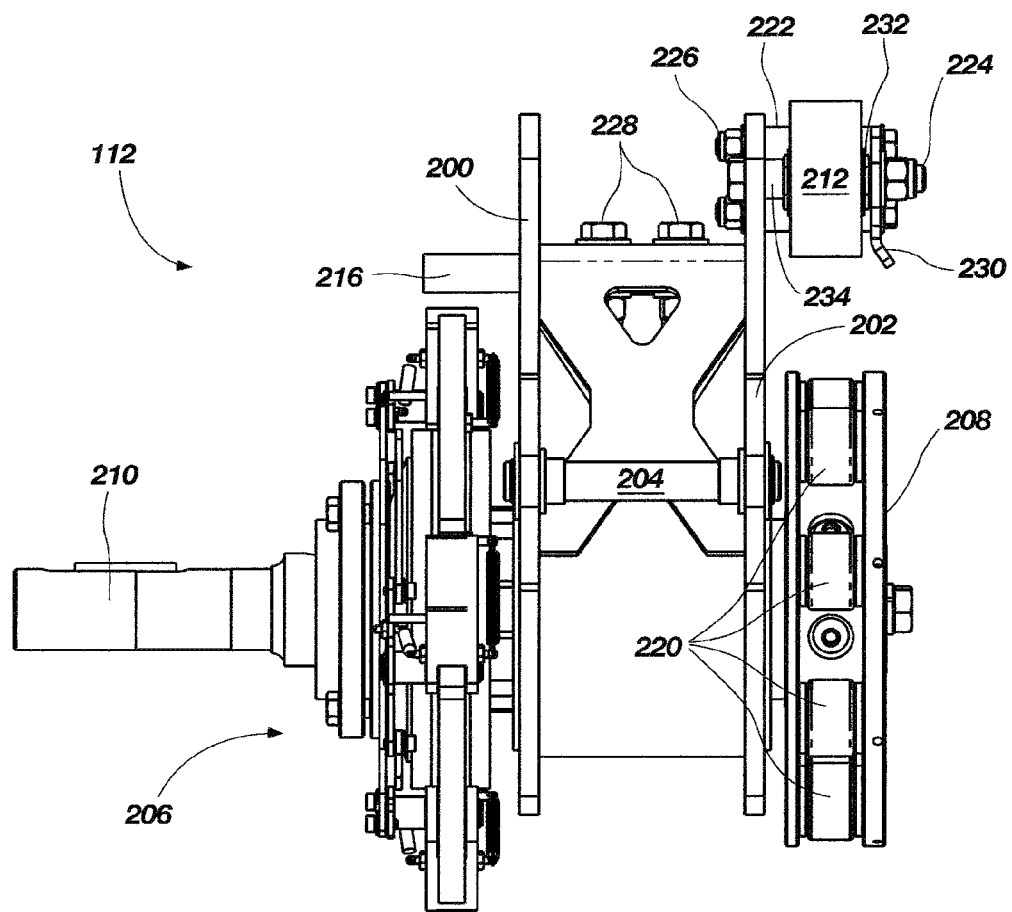
Figure 2E:
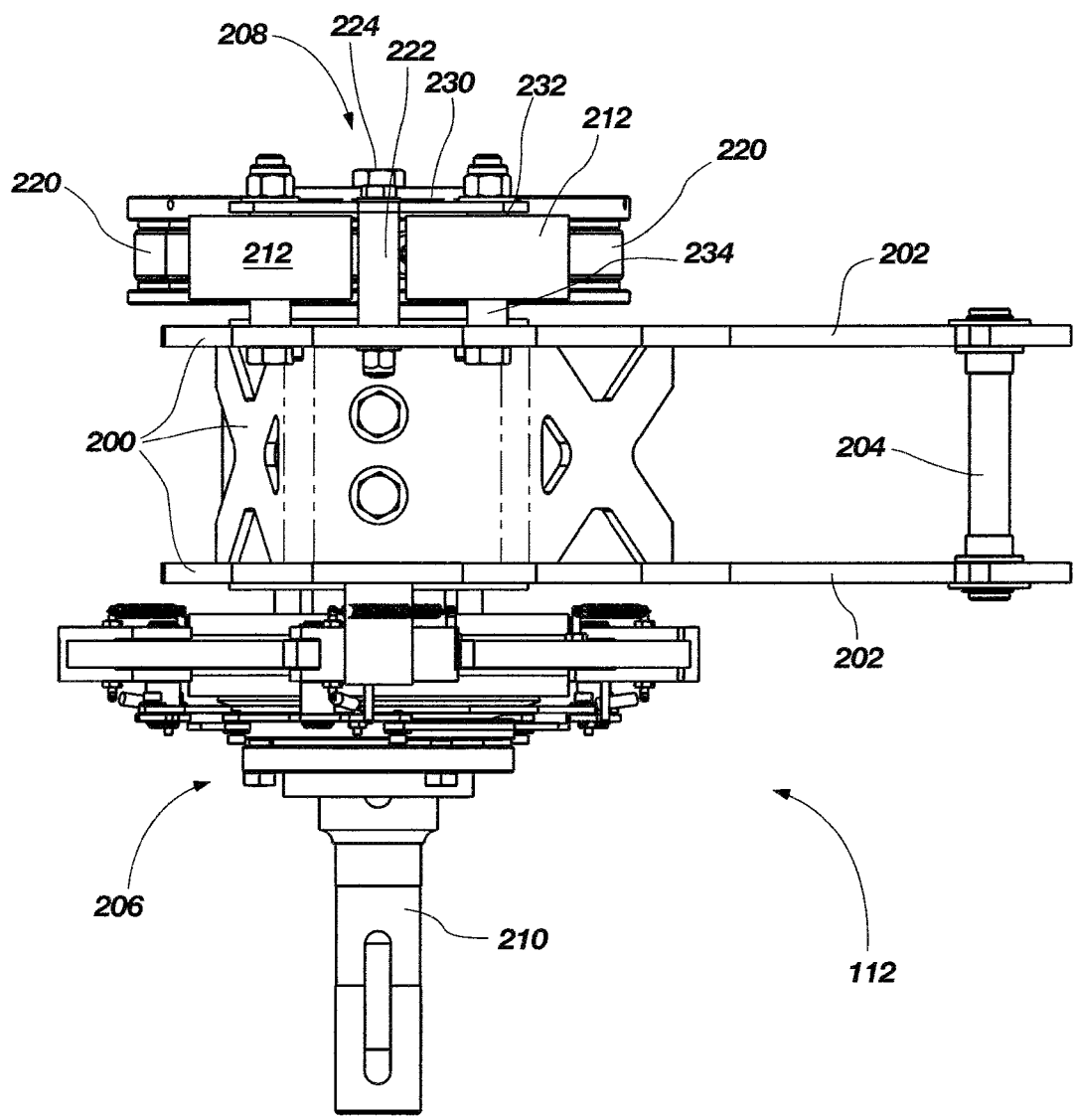

As shown in FIGS. 2C-2E, an embodiment of a left drive assembly 112 may include a drive housing weldment 200, a reaction arm 202 and reaction pin 204. According to the illustrated embodiment, drive housing weldment 200 provides structural support for a safety assembly 206 and a drive sprocket assembly 208 (both not visible in FIG. 2C). The drive sprocket assembly 208 may be used to engage teeth on a rack 197 (FIG. 1A) for driving a vehicle 100 along a monorail 199 (FIGS. 1A-1B). According to one embodiment, the teeth of the rack 197 may be cycloid-shaped as disclosed in co-pending U.S. patent application Ser. No. 12/075,619. Left drive assembly 112 may further include a drive shaft 210 in communication with the safety assembly 206 and the drive sprocket assembly 208 with pinion drive rollers 220. The embodiment of a left drive assembly 112 shown in FIGS. 2C-2E also include rack wheels 212 which rest and roll upon a generally flat edge of the rack 197 opposite the teeth of the rack 197 which are engaged by pinion drive rollers 220 (not shown in FIG. 2C) of the drive sprocket assembly 208. The rack wheels 212 may be secured to a rack wheel block 222 (FIGS. 2D-2E) using fasteners 224 (FIGS. 2D-2E). The rack wheel block 222 may in turn be secured to drive housing weldment 200 using additional fasteners 226 (FIG. 2D). Reaction stop 216 (FIGS. 2A-2D) may be secured to drive housing weldment 200 using fasteners 228 (FIG. 2D). Fasteners 224, 226 and 228 may be nuts, bolts and washers of suitable dimensions and strength, the selection of which is within the knowledge of one of ordinary skill in the art. FIGS. 2D and 2E both illustrate a rack retainer 230 used to prevent the rack wheels 212 from disengaging the rack 197 (FIGS. 1A-1B). FIGS. 2D-2E also illustrates wheel spacers 232 and 234.

A safety assembly 206 provides emergency braking during an over-speed condition. During an over-speed situation, the safety teeth 214A, 214B (FIG. 2C) engage reaction stop 216 by centrifugal force activation in the safety assembly 206. According to one embodiment, an adjustable over-running clutch disc brake (not shown) is engaged simultaneously with the safety assembly 206 to decelerate the pinion drive rollers in a controllable fashion, bringing them to a calculated stop. A unique feature of this embodiment of a safety assembly 206 is that the centrifugal force activation of the safety assembly 206 works in both directions of rotation and is adjustable for activation. Thus, this safety feature works along any path or direction of a monorail 199 (FIGS. 1A-1B). Another useful feature of this embodiment is that centrifugal engagement of safety assembly 206 also prevents an over-speed condition in any plane of alignment, thus negating the effects of gravity. These bidirectional and universal plane activation features of safety assembly 206 may be achieved, for example and not by way of limitation, using linkages 218 attached to safety teeth 214A, 214B in opposing pairs (sometimes referred to in the art as "dogs") as shown in FIG. 2C.

According to the illustrated embodiment, the safety assembly 206 is a purely mechanical braking means that only engages in an over-speed situation. The safety assembly 206 is electrically monitored to sense engagement. According to one embodiment, when a safety tooth 214A, 214B comes in contact with reaction stop 216, an emergency electrical shut-down signal is triggered which may engage other braking systems and shut down the electrical motor system 108, if this has not already occurred through other electrical monitoring systems. According to other embodiments of the present invention, there may be electrical monitoring devices both in the motor system 108 (FIGS. 1A-1D) and in the control system (not shown) for sensing an over-speed condition and engaging other braking systems prior to the mechanical over-speed safety assembly 206. According to these embodiments, the mechanical over-speed safety assembly 206 may be the last in the line of sequenced over-speed protections to be activated.

Referring again to FIG. 2C, the safety assembly 206 further comprises a safety plate 236, which is mounted to a bushing (not shown) within a torque limiter 238. The torque limiter 238 is fixedly mounted to, and rotates with, the drive shaft 210. This embodiment of drive shaft 210 is continuous through the left drive assembly 112 and has the drive sprocket assembly 208 mounted on the opposite end, which is engaging teeth in the rack 197. Under normal operation, safety plate 236 rotates with the torque limiter 238, because the torque limiter 238 holds the safety plate 236 in place by friction caused by friction discs (not shown) within the torque limiter 238. During an over-speed condition, safety teeth 214A or 214B are forced outward by centrifugal force. When one of the teeth 214A or 214B comes in contact with reaction stop 216, the safety plate 236 stops rotation. Safety plate 236 is now held in a fixed position by reaction stop 216 and is then driving through the friction discs (not shown) on the bushing (not shown) within the torque limiter 238. The friction caused by the friction discs in the torque limiter 238 causes a deceleration and controlled gradual stop of the drive shaft 210 rotation which the torque limiter 238 is mounted on. This controlled gradual stop brings vehicle 100 to a controlled gradual stop as well.

Exemplary embodiments of a torque limiter 238 suitable for use with vehicle 100 of the present invention include models 500 and 700 Torque Limiters available from Great Lakes Industries, Inc. 1927 Wildwood Ave., Jackson, Mich. 49202-4061. However, it will be understood that any suitable torque limiter, clutch brake, or wet disk brake may also be used according to the principles of the safety assembly 206 of the present invention. A torque limiter 238 may include a Bellevue spring assembly (not shown) which can be adjusted against the friction discs (not shown) for selective application of different brake torques to be applied under different conditions (e.g., angle of inclination, cabin capacity and load, etc.) Thus, each safety assembly 206 allows adjustment of the braking distance and deceleration rates to any desired limit, including mechanical code compliant limits as may be desired.

Another feature of this embodiment of a safety assembly 206 is that the drive sprocket assembly 208, drive shaft 210 and safety assembly 206 may be designed to a much higher safety factor while keeping each gearbox assembly 120A and 120B (FIGS. 1C-1D) to a reasonable safety and service factor. This design and safety feature allows for use of a gearbox assembly 120A or 120B which is more reasonable in size and weight. For example and not by way of limitation, an embodiment of vehicle 100 may include a safety factor of 8× on the safety assembly 206, sufficient for meeting the intent of the elevator safety code, while the gearbox assembly 120A or 120B may be designed with a safety factor of about 4×.

Figure 3A:
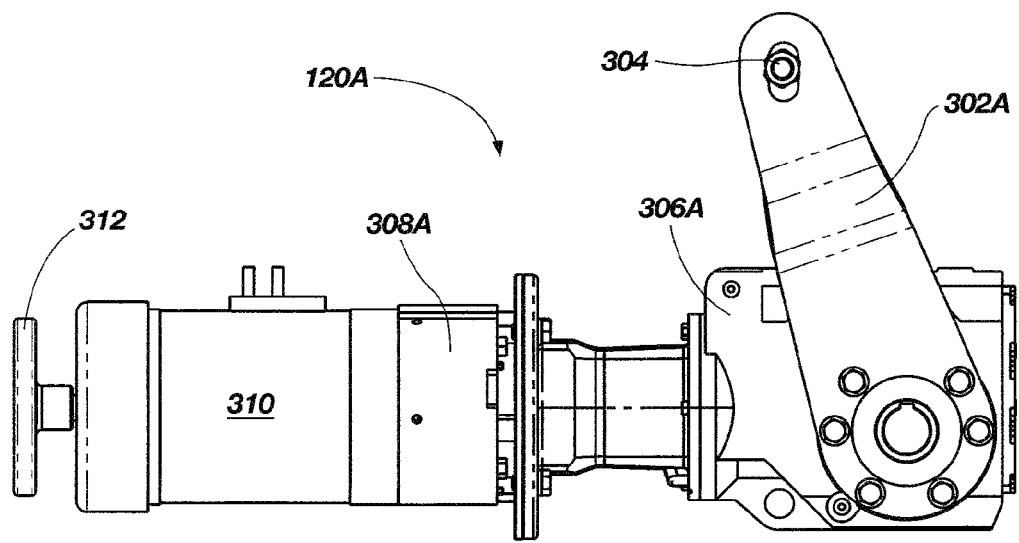
FIGS. 3A and 3B are drawings of embodiments of left and right configurations of the gearbox assemblies, according to the present invention.
Figure 3B:
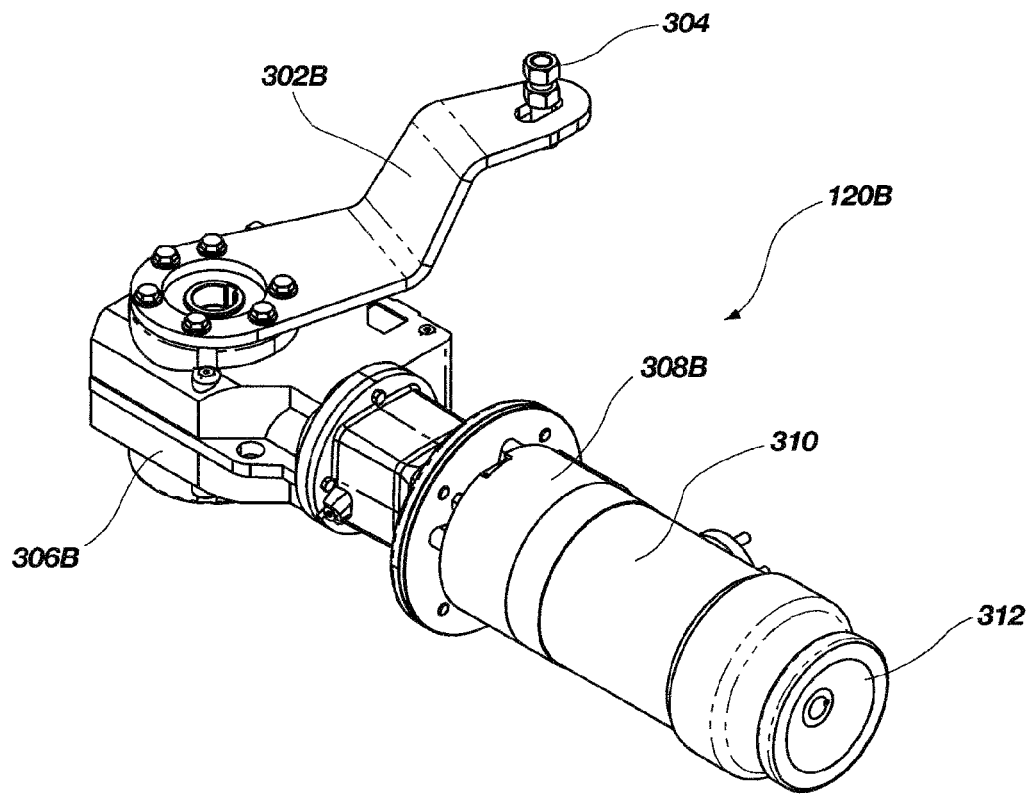

Referring now to FIGS. 3A and 3B, left and right configurations of the gearbox assemblies 120A and 120B are illustrated according to embodiments of the present invention. It will be readily apparent that there is significant symmetry between the left and right configurations of gearbox assemblies 120A and 120B. FIG. 3A is a rear view of an embodiment of a left gearbox assembly 120A. Left gearbox assembly 120A may include a left reaction arm 302A configured to be mounted to a gearbox 306A, which may in turn be coupled to a left brake assembly 308A, which may in turn be coupled to a motor 310. Similarly, as shown in the perspective view of FIG. 3B, right gearbox assembly 120B may include a right reaction arm 302B configured to be mounted to a gearbox 306B, which may in turn be coupled to a right brake assembly 308B, which may in turn be coupled to a motor 310. The reaction arms 302A and 302B are used to support the gearbox assemblies 120A and 120B on the carriage chassis 400 (see, FIGS. 4A-4B and related discussion below). The reaction arms 302A and 302B may be mounted to the carriage chassis 400 using mounting bolts 304. Motors 310 may include hand wheel 312 for manually turning a drive shaft (not shown) inside each motor 310. It will be apparent that the left and right gearbox assemblies 120A and 120B are symmetrical. Though two symmetrical gearbox assemblies 120A and 120B are shown, it will be understood that other embodiments of vehicle 100 may alternatively employ a single gearbox assembly to drive the vehicle 100 along a monorail 199.

A gearbox 306A or 306B may be any suitable transmission device between a motor 310 and a drive assembly 112 and 114. A gearbox 306A or 306B may be used to translate rotational motion from a motor 310 in a suitable direction for driving a drive assembly 112 or 114, and may or may not have multiple gears for adjusting the rotational speed output by motor 310. For example and not by way of limitation, an exemplary gearbox 306A or 306B suitable for use with vehicle 100 may be model number KA67AM184 gearbox available from SEW-Eurodrive, Inc., P.O. Box 518, Lyman, S.C. 29365. It will be understood that other transmission devices from other vendors may also be suitable as a gearbox 306A or 306B, according to the principles of the present invention.

Each left and right brake assembly 308A and 308B may be any suitable braking system for selectively slowing the rotational output of the motors 310. For example and not by way of limitation, brake assemblies 308A and 308B may be torque limiters, clutch brakes, disc brakes, wet disc brakes or drum brakes according to various embodiments of the present invention. Such brake systems and their application to selectively reduce rotational output of a motor are well known to those of ordinary skill in the art and, thus, will not be further elaborated herein. Exemplary brake assemblies 308A and 308B suitable for use with vehicle 100 may be model numbers 031133 and 031109 Dodge Motor Brakes available from Baldor Electric Company, Corporate Headquarters, 5711 R. S. Boreham, Jr. St., P.O. Box 2400, Fort Smith, Ariz. 72901. However, it will be understood that other kinds of brake assemblies 308A and 308B may also be suitable as a motor brake for selectively slowing the rotational output of the motors 310, according to the principles of the present invention.

Motors 310 may be any suitable motors or even a single motor system for providing a source of rotational power for selectively driving the drive sprocket assemblies 208 (FIGS. 2D-F) through the brake assemblies 308A and 308B and corresponding gearboxes 306A and 306B according to the present invention. Motors 310 may be selected from any suitable motor technology including an electric motor, a fossil fuel engine, or a hybrid of the two. An exemplary battery-powered electric motor suitable for use as motor 310 may be an AC induction motor, model number AC9-05-1 available from Hi Performance Golf Cars, Inc., 1551 South Vineyard Avenue, Ontario, Calif. 91761. The exemplary embodiment of a motor 310 described herein is a battery-powered, AC induction motor. However, it will be understood that other embodiments may include an electrification rail to obviate the use of battery power. Various types of electric motors that may be suitable for use as motor 310 may include, for example and not by way of limitation, AC asynchronous motors, asynchronous and synchronous servomotors and AC induction motors. The particular workings and applications of all such motors will be readily understood by one of ordinary skill in the art and, thus, will not be further elaborated herein.

Figure 4A:
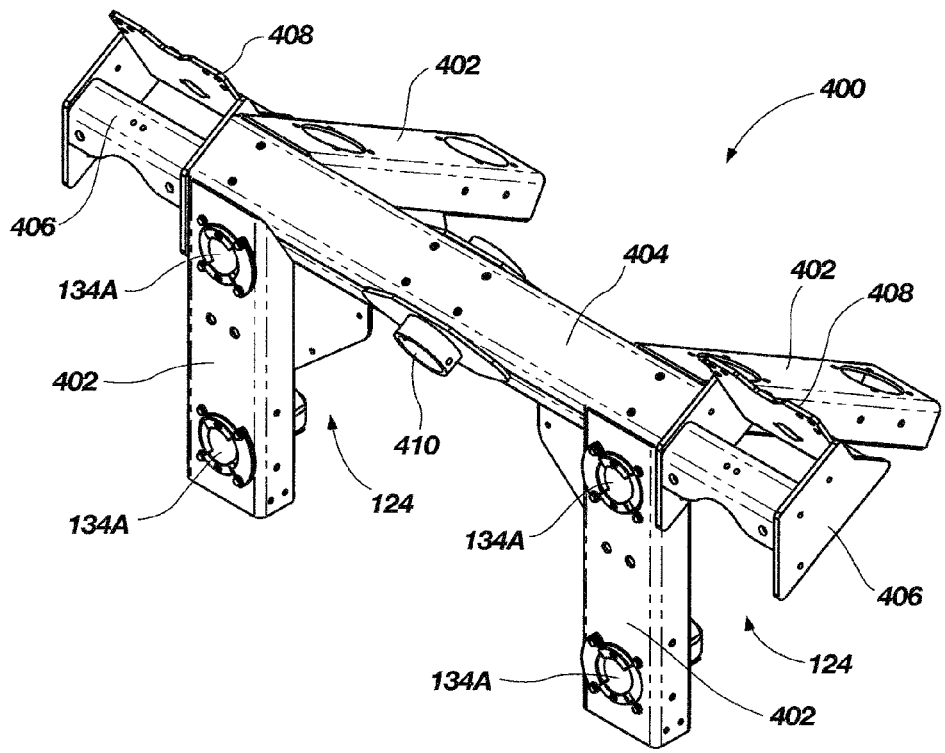
FIGS. 4A and 4B are rear perspective and front views of an embodiment of a carriage chassis for supporting a vehicle on a monorail, according to the present invention.
Figure 4B:
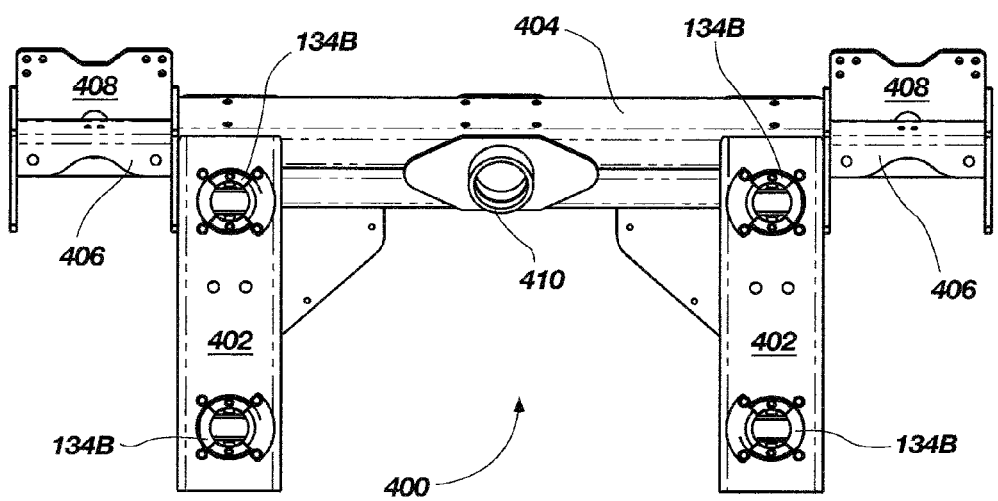

FIGS. 4A and 4B are rear perspective and front views of an embodiment of a carriage chassis 400 for supporting a vehicle 100 on a monorail 199, according to the present invention. Carriage chassis 400 may be formed of steel, aluminum, titanium, composite materials or any other suitable structural material configured with sufficient strength and rigidity to support vehicle components described herein. As best shown in FIG. 4A, carriage chassis 400 includes two triangle carriages 124, one at each end. Each triangle carriage 124 may include two triangle carriage structures 402 (four shown) extending from chassis beam 404. Disposed about each end of chassis beam 404 are drive supports 406 (FIGS. 4A and 4B) with tilt mechanism mounting flanges 408 configured for attachment to actuators 126 (FIG. 1C). Chassis beam 404 further includes a centrally located cabin axle retainer 410. FIG. 4A further illustrates the placement and installation of cabin cartridges 134A (two each in the forward facing triangle carriage structures 402). FIG. 4B further illustrates the placement and installation of drive cartridges 134B (two each in the forward facing triangle carriage structures 402). The cabin and drive cartridges 134A and 134B each support a wheel (not shown) that rests on the monorail 199 and allows the vehicle 100 to freely roll along the monorail 199 subject to the pinion drive rollers 220. The cabin and drive cartridges 134A and 134B may be selectively dimensioned and configured with or without springs or other dampeners to smooth the cabin ride according to various embodiments.

Figure 5A:
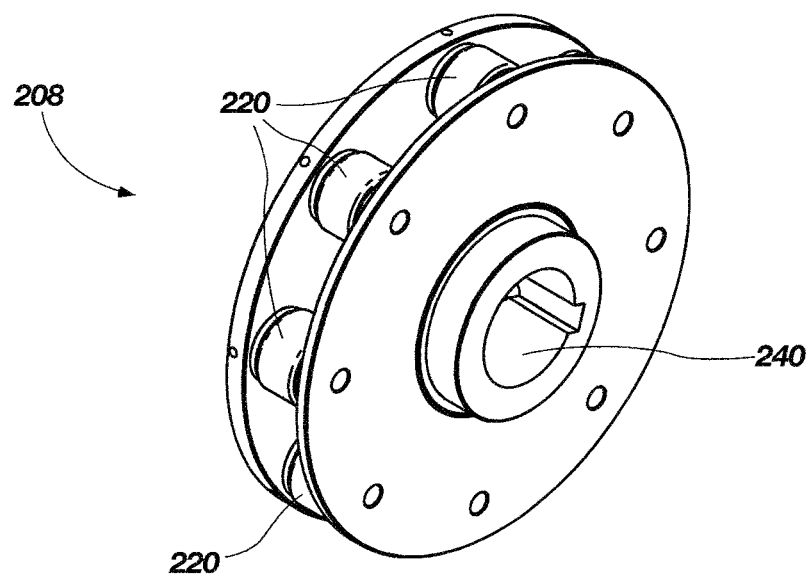
FIGS. 5A and 5B are perspective and edge views of an embodiment of a drive sprocket assembly for use in a vehicle according to the present invention.
Figure 5B:
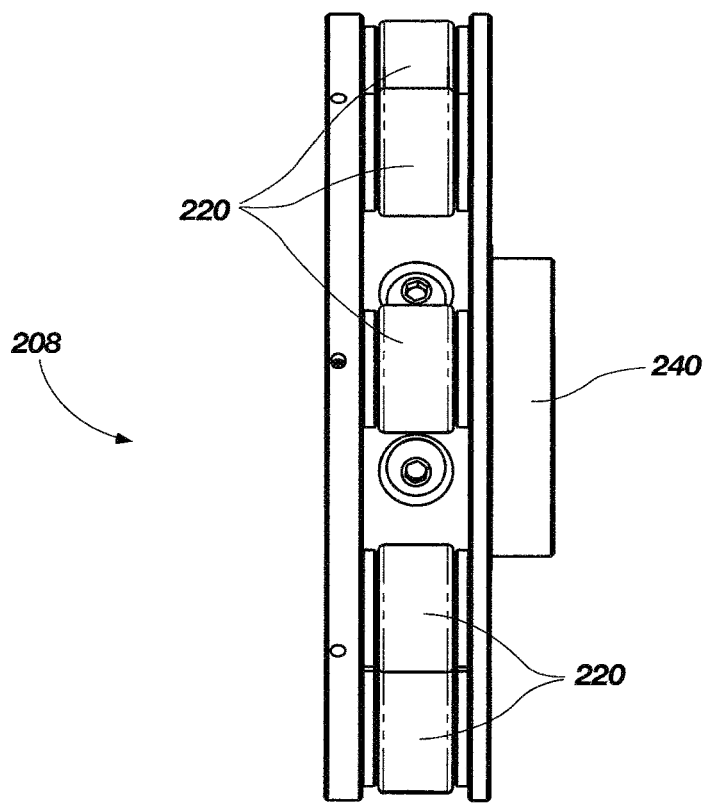

FIGS. 5A and 5B are perspective and edge views of an embodiment of a drive sprocket assembly 208 according to the present invention. Each drive sprocket assembly 208 includes a plurality of pinion drive rollers 220 and a drive sprocket hub 240. While the drive sprocket assemblies 208 illustrated include eight pinion drive rollers 220, other embodiments may include fewer or more pinion drive rollers 220. Each drive sprocket assembly 208 engages teeth along a rack 197 attached to the monorail 199 to provide traction to vehicle 100. There are two such drive sprocket assemblies 208 in the described embodiment of vehicle 100.

Figure 6A:
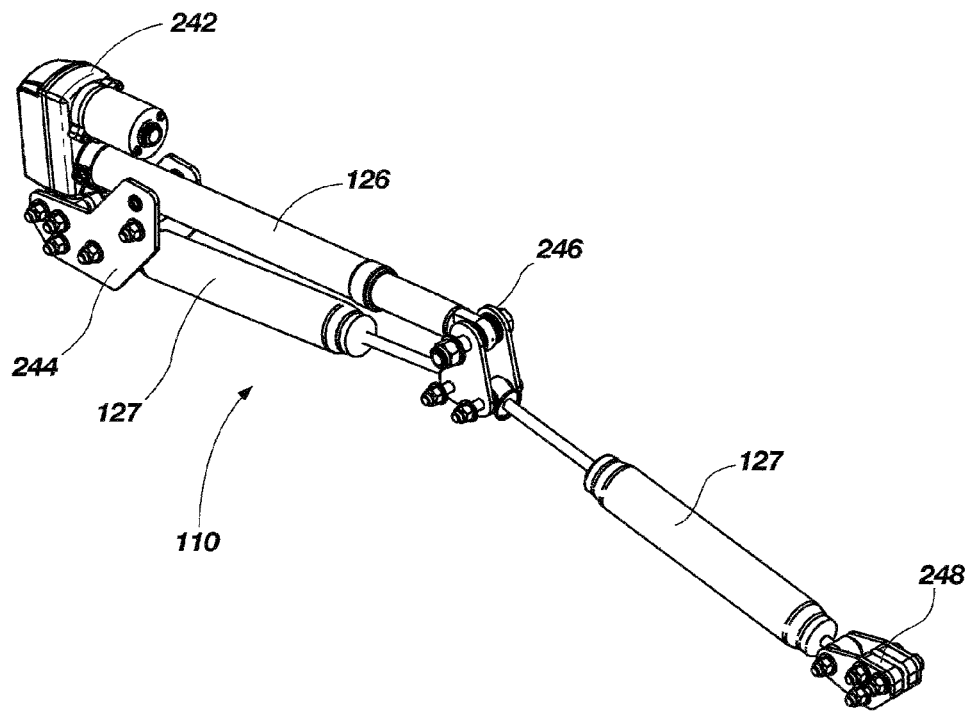
FIGS. 6A and 6B are perspective and front views of an embodiment of a tilt mechanism for use in a vehicle, according to the present invention.
Figure 6B:
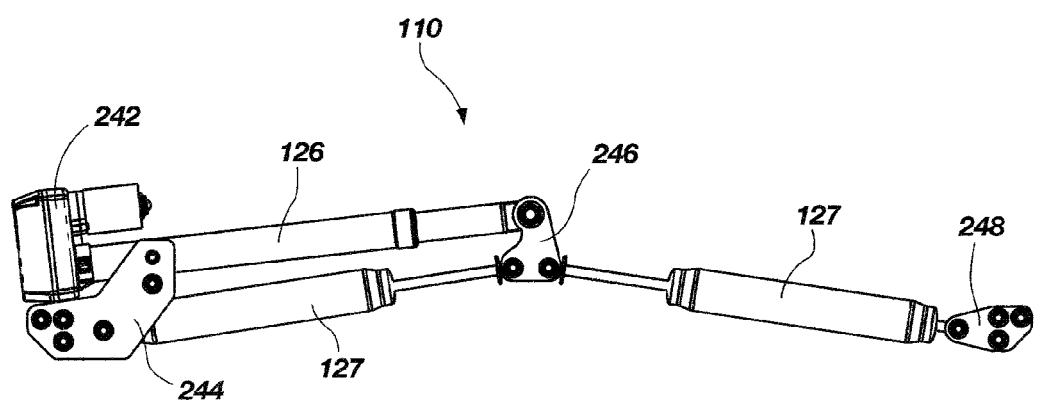

FIGS. 6A and 6B are perspective and front views of an embodiment of a tilt mechanism 110, according to the present invention. Tilt mechanism 110 may include an actuator 126, an actuator motor 242, two shock absorbers 127, actuator mount 244, tilt arm cam 246 and shock mount 248. Actuator mount 244 and shock mount 248 are configured for mounting to the tilt mechanism mounting flanges 408 (FIGS. 4A-4B). Tilt arm cam 246 is coupled to arm 128 (FIGS. 1C-1D) when assembled in the vehicle 100. Selective activation of the actuator 126, via actuator motor 242, results in cabin 102 (FIGS. 1A-1B) rotation along the axis of the cabin axle 132 (FIGS. 1C-1D).

An embodiment of a vehicle 100 for transporting a payload along a monorail 199 is disclosed. The vehicle 100 may include a cabin 102 configured for carrying the payload. The vehicle 100 may further include a counterwheel assembly 104 configured for wheeled engagement around the monorail 199, wherein the monorail 199 is triangular cross-sectioned. The vehicle 100 may further include a platform assembly 106 configured for supporting the cabin 102. The platform assembly 106 may further include a cabin axle 132 rotationally connected to the counterwheel assembly 104. The vehicle 100 may further include a leveling control system attached to the platform assembly 106 and in rotational communication with the cabin axle 132. The vehicle 100 may further include a motor system mounted to the counterwheel assembly 104 for driving the vehicle 100 along the monorail 199.

According to one embodiment of vehicle 100, the leveling control system may be a tilt mechanism 110 in communication with the platform assembly 106 for selectively rotating the cabin 102 about the cabin axle 132. According to another embodiment of vehicle 100, the tilt mechanism 110 may be configured for leveling the cabin 102 by selectively rotating the cabin 102 during changes in monorail inclination. According to other embodiments of vehicle 100, the selective rotation of the cabin may range up to about 50 degrees of angular rotation. According to still other embodiments of vehicle 100, the tilt mechanism 110 may be configured for pre-leveling the cabin 102 to counteract changes in cabin horizontal force. According to other embodiments of vehicle 100, the tilt mechanism 110 may further include at least one actuator 126 selected from the following types of actuators: electric, hydraulic or pneumatic actuators. Such types of actuators are known to those of ordinary skill in the art and thus will not be further elaborated herein. According to one embodiment of vehicle 100, the at least one actuator 126 is in communication with a tilt arm 128 of the platform assembly 106.

Figure 8:
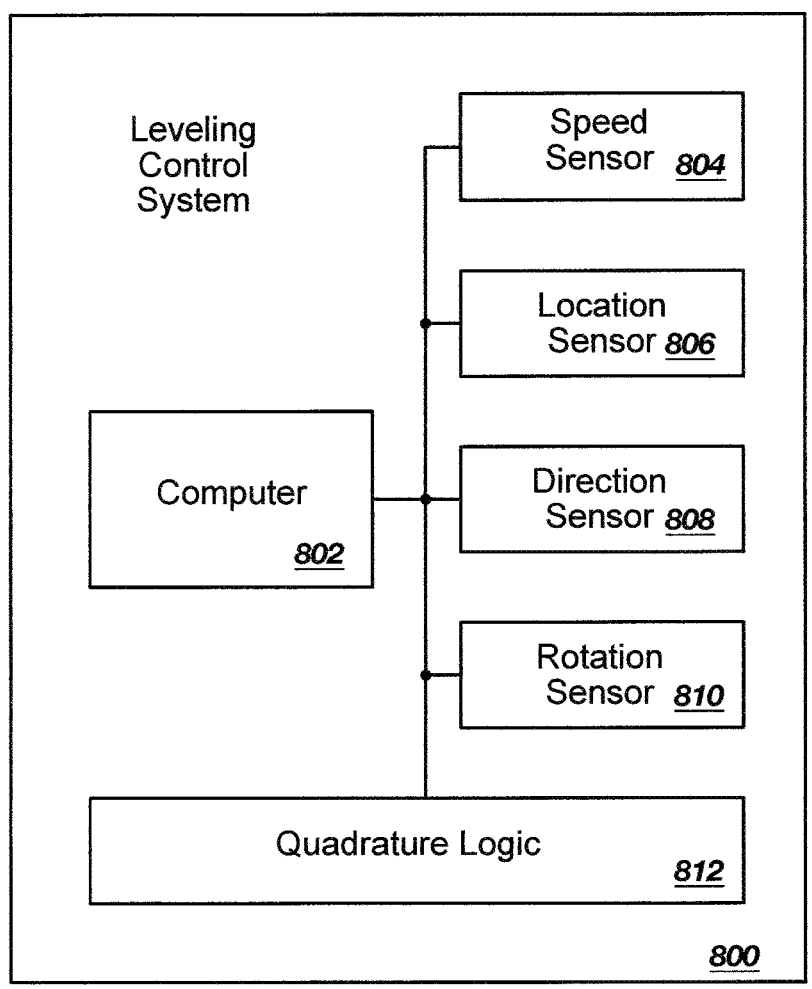
FIG. 8 illustrates a block diagram of an embodiment of a leveling control system according to the present invention.

According to other embodiments of vehicle 100, the leveling control system may be configured for receiving and processing information for selectively rotating the cabin 102. The information may include at least one of following types of information: vehicle location along the monorail, monorail inclination, vehicle speed, vehicle direction and current vehicle rotation. FIG. 8 illustrates a block diagram of an embodiment of one particular leveling control system 800 according to the present invention. The leveling control system 800 may include a computer 802 in communication with sensors for speed 804, location 806, direction 808 and rotation 810 of the cabin. It will be understood that computer 802 may be interfaced to many other environmental sensors, e.g., altitude, temperature, wind speed, etc. According to one embodiment, the computer 802 of leveling control system 800 may be configured to drive actuators (such as actuator 126, FIGS. 1C and 6A-6B) for leveling or pre-leveling the cabin 102 by selective rotation of the cabin 102 about the cabin axle 132 in response to information generated by the sensors 804, 806, 808, 810 and other derived or measured parameters, such as acceleration, etc. According to an alternative embodiment of vehicle 100, quadrature logic 812 may be interfaced to the same sensors 804, 806, 808, 810, or other sensors (not shown) to perform the leveling control functions of computer 802.

Computer 802 may be any suitable computer including a processor, an embedded microcontroller, a personal digital assistant, a tablet personal computer (PC), a notebook PC or desktop PC. Computer 802 may be interfaced to a user interface in the cabin 102 for manual control of the vehicle. Computer 802 may also be interfaced to one or more stations, e.g., base station 702, or end point station 710 (FIG. 7), via a wireless network (not shown).

Figure 9A:
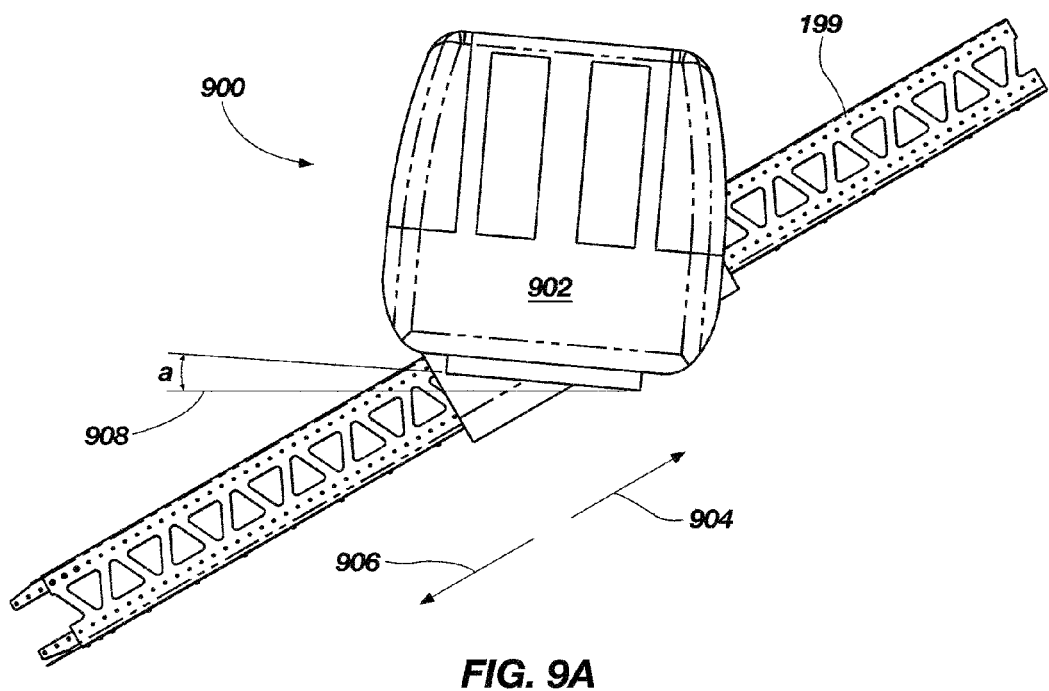
FIGS. 9A and 9B are side views of a vehicle illustrating pre-leveling of a cabin as discussed herein and according to an embodiment of the present invention.
Figure 9B:
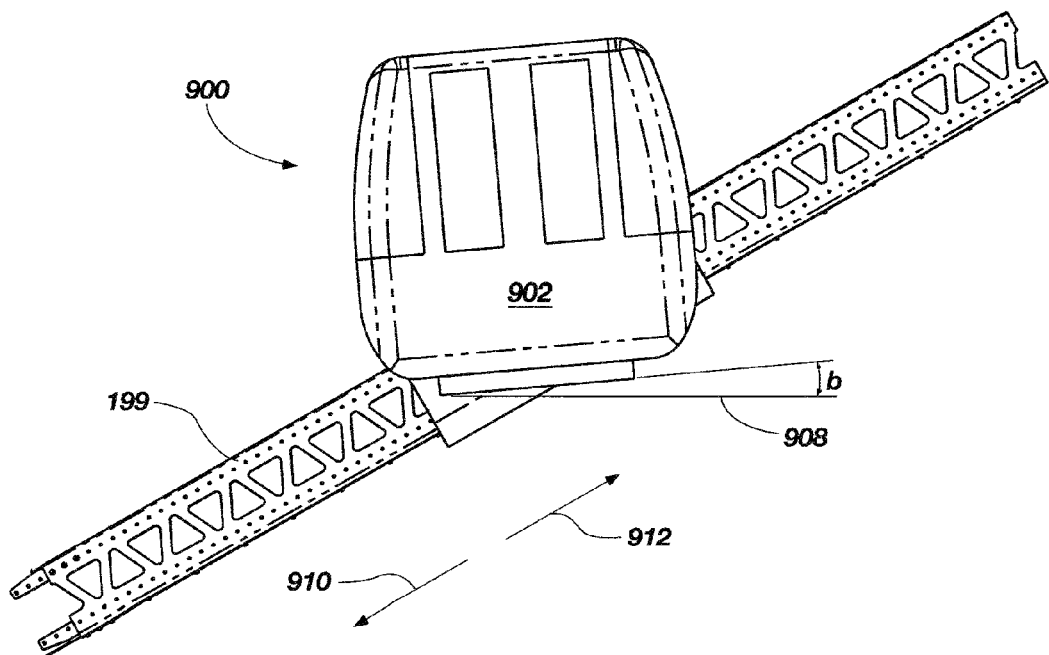

FIGS. 9A and 9B are side views of a vehicle 900 illustrating pre-leveling of a cabin 902 as discussed herein and according to an embodiment of the present invention. FIG. 9A illustrates a pre-leveling of cabin 902 on monorail 199 that may be suitable for upward acceleration, shown at long arrow 904, or downward deceleration, shown at short arrow 906. As shown in FIG. 9A, the cabin 902 is rotated approximately "a" degrees clockwise from horizontal, shown at line 908. Similarly, FIG. 9B illustrates a pre-leveling of cabin 902 on monorail 199 that may be suitable for downward acceleration, shown at long arrow 910, or upward deceleration, shown at short arrow 912. As shown in FIG. 9B, the cabin 902 is rotated at an angle approximate "b" degrees counterclockwise from horizontal, shown at line 908. This, pre-leveling (rotation of the cabin) may be achieved to overcome some or all of the lateral or horizontal force affects of acceleration or deceleration of a vehicle traveling along a monorail 199.

Figure 10:
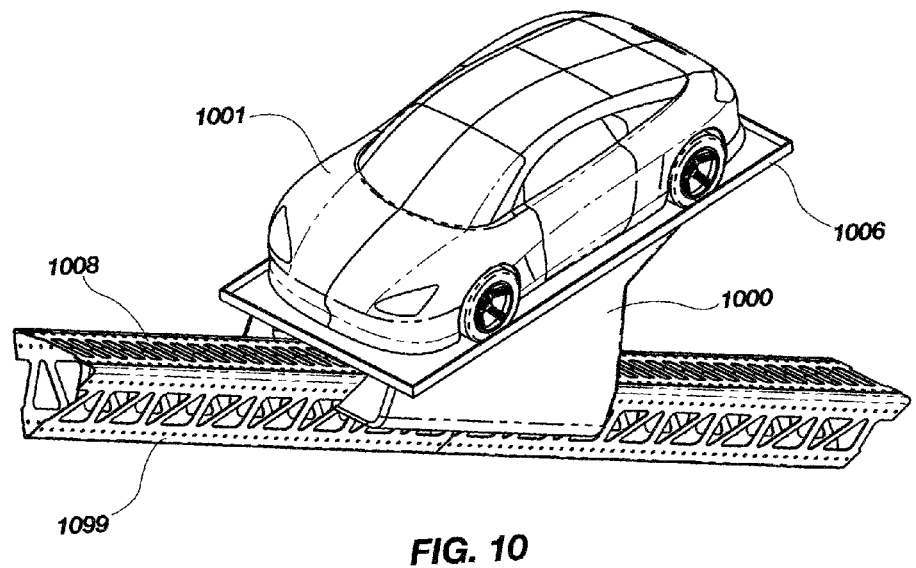
FIG. 10 illustrates a perspective view of an embodiment of a vehicle including a platform placed substantially over the monorail, according to the present invention.

As shown in the embodiment of FIG. 1A, the cabin 102 may be cantilevered to the side of the monorail 199. It will be understood that many other configurations are also possible according to the principles of the present invention. For example, the cabin may be placed substantially above the monorail, according to one embodiment. FIG. 10 illustrates a perspective view of an embodiment of a platform carrier assembly 1000 including a platform 1006 placed substantially over the monorail 1099, instead of a cabin 102, that may be used to transport an automobile 1001, for example, or any other large object that may be placed on the platform 1006. The platform carrier assembly 1000 may be used to transport an automobile 1001 up hills or along any path for which a monorail 1099 can be installed. Note that the orientation of the triangular cross-sectioned monorail 199 may be configured with an upwards oriented face 1008 rather than an upwards oriented crown as shown in FIG. 1A.

Referring again to the embodiment of a vehicle 100 shown in FIG. 1A, the cabin 102 may be configured to carry a payload of passengers and their personal effects such as luggage, skis, snowboards, etc. However, the scope of the embodiments of the invention is not limited to a cabin 102 for carrying passengers, and it will be understood that cabin 102 may be used to carry anything that will fit inside the cabin 102.

Figure 11:
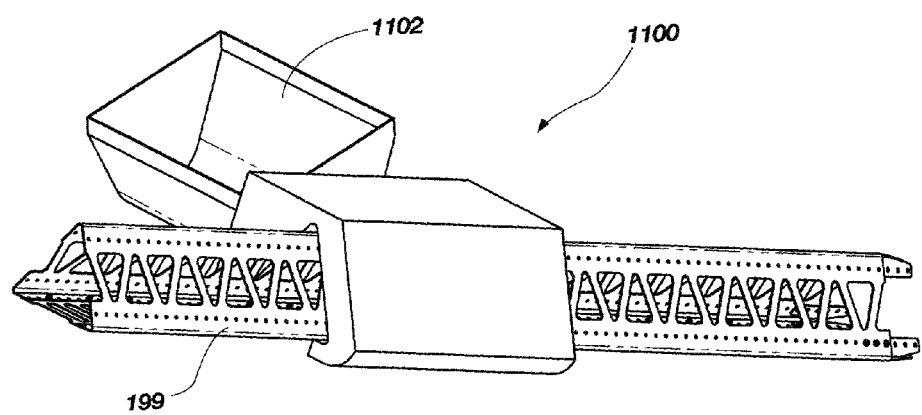
FIG. 11 is a perspective view of an embodiment of a cantilever dump assembly for transporting bulk materials along a monorail, according to the present invention.

FIG. 11 is a perspective view of an embodiment of a cantilever dump assembly 1100 for transporting bulk materials along a monorail 199. Cantilever dump assembly 1100 may include a bucket 1102 (also referred to herein as a "bulk material carrier") that may be selectively rotated about a pivot (not shown) for emptying according to an embodiment of the present invention. Cantilever dump assembly 1100 could be used in the mining industry for transportation of any suitable payload including ore from one location to another, or from one location to other vehicles such as dump trucks, or up steep surfaces, e.g., in the context of open pit or deep tunnel mining.

Figure 12:
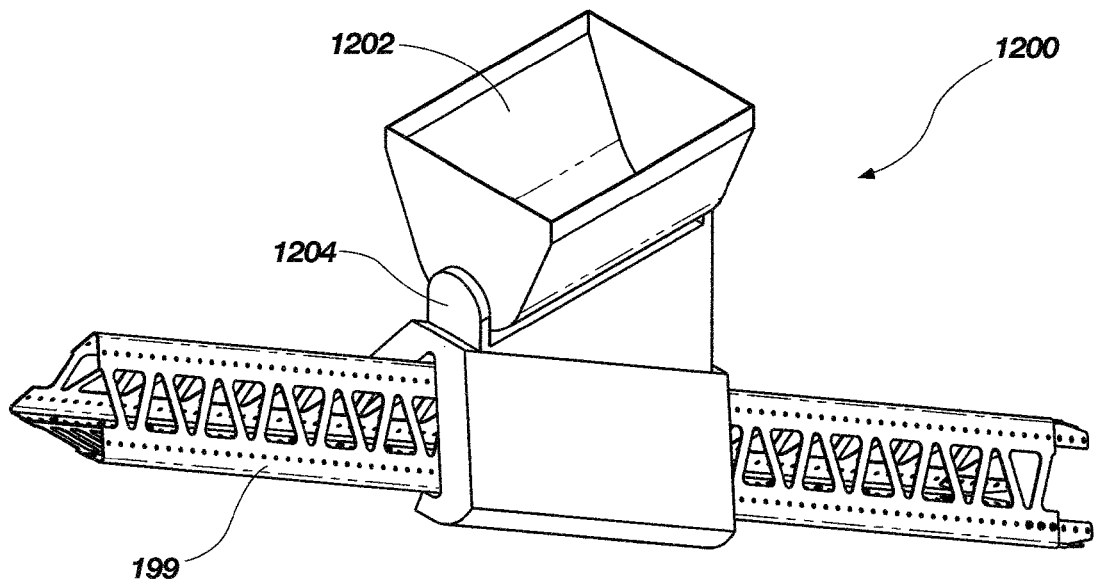
FIG. 12 is a perspective view of an embodiment of a dump assembly for transporting bulk materials along a monorail, according to the present invention.

FIG. 12 is a perspective view of an embodiment of a dump assembly 1200 for transporting bulk materials along a monorail 199. As shown in FIG. 12, the dump assembly 1200 may include a bucket 1202 that may be mounted substantially over the top of monorail 199 and that may be selectively rotated about a hinge 1204 for emptying according to an embodiment of the present invention. The applications for a dump assembly 1200 may be similar to those of cantilever dump assembly 1100 discussed above.

Figure 13:
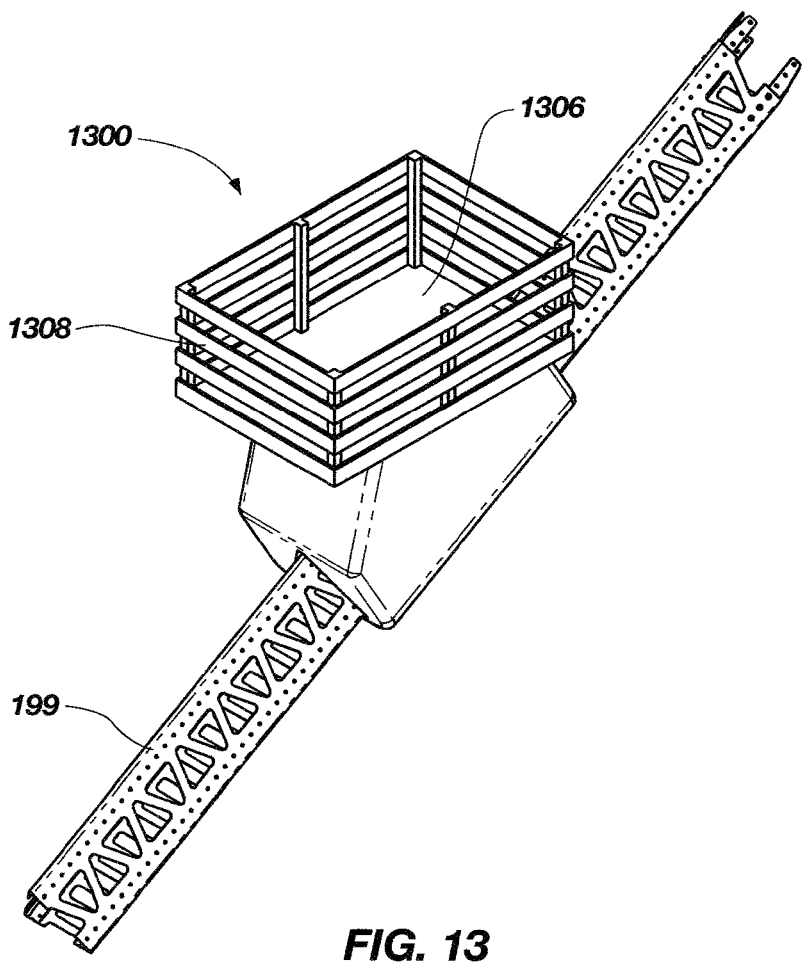
FIG. 13 is a perspective view of an embodiment of a fenced wagon carrier that may be used to transport people or objects in an open-air environment according to the present invention.

FIG. 13 is a perspective view of an embodiment of a fenced wagon carrier 1300 that may be used to transport people or objects in an open air environment according to the present invention. Fenced wagon carrier may include a wall (not shown) or fence 1308 (shown) around the perimeter of a platform 1306 for retaining persons or objects during transportation. The wall or fence 1308 may have a gate (not shown) for ingress and egress to the platform 1306.

Figure 14:
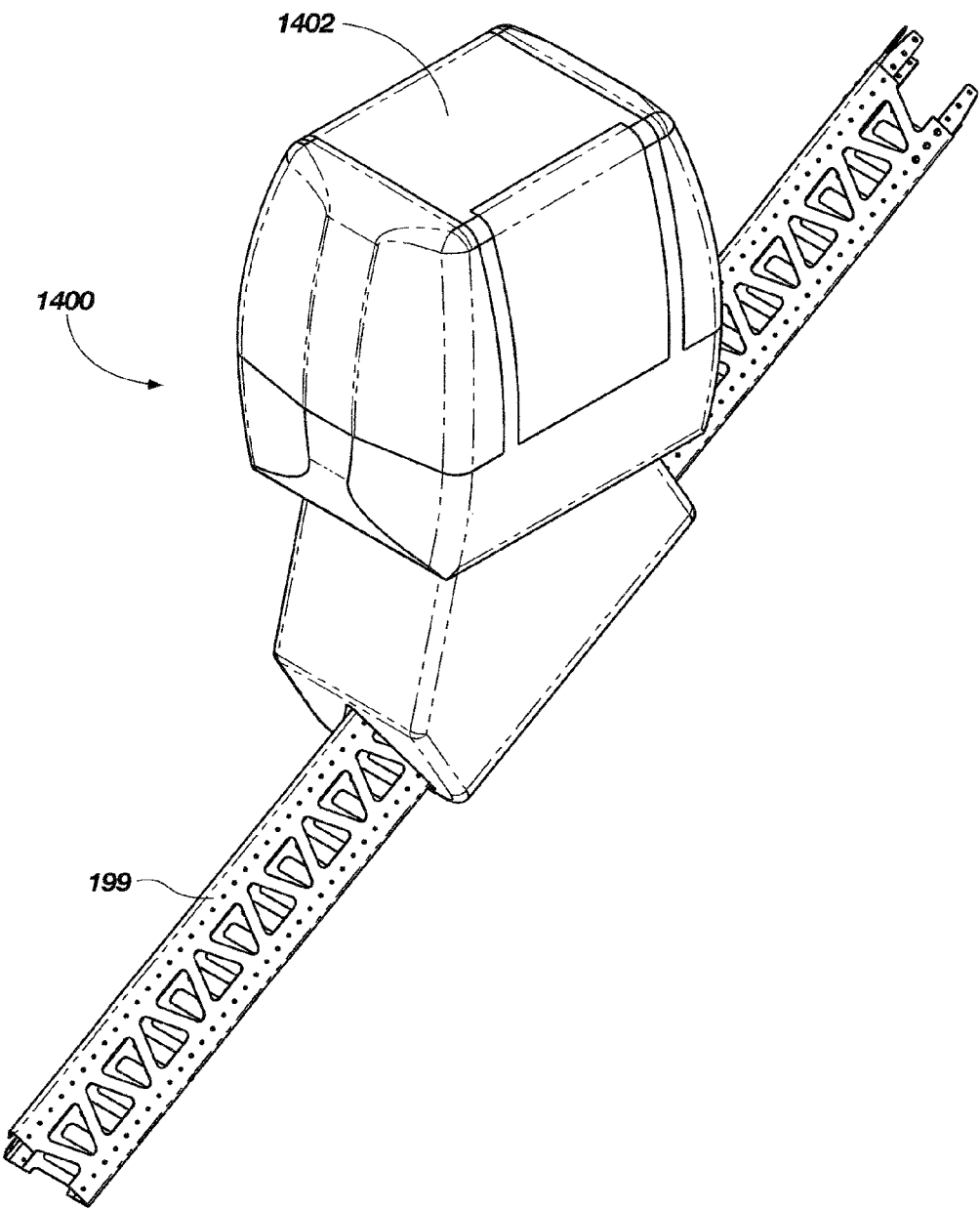
FIG. 14 is a perspective view of an embodiment of a top-mounted cabin vehicle, according to the present invention.

Other variations on the cabin 102 of FIG. 1A are also consistent with the principles of the present invention. For example, and not by way of limitation, FIG. 14 is a perspective view of an embodiment of a top-mounted cabin vehicle 1400 according to the present invention. The top-mounted cabin vehicle 1400 may include a cabin 1402 mounted substantially above monorail 199.

Another embodiment may be for use in a substantially vertical or elevator application. FIGS. 15A and 15B are rear perspective and side views of an embodiment of vertical tower vehicle 1500 according to the present invention. The vertical tower vehicle 1500 may include a cabin 1502 suspended from a side 1503 of a vertically oriented monorail 1599. According to one embodiment (not shown) the cabin 1502 traverses the length of monorail 1599 on its own power. According to the illustrated embodiment, vertical tower vehicle 1500 may include a counterweight system 1550 to reduce the load on the motor(s) moving cabin 1502 or to balance the weight of the cabin 1502. The counterweight system 1550 may include a cable 1552 wrapped around an upper pulley 1554 and attached to a weight 1556 (FIG. 15A only) and a carriage assembly 1504 that supports cabin 1502.

According to some embodiments of a vehicle 100, 1500 and 1400, the cabin may be a personnel carrier and the payload may be passengers. According to other embodiments of a vehicle 1100 and 1200, the cabin or payload carrier may be a bulk material carrier. As noted above, embodiments of a cabin 102 may be configured to rotate to a select number of degrees for pre-leveling and other cabin conditioning. Some cabin configurations may fully rotate. For example, the bucket 1102 or bulk material carrier of cantilever dump assembly 1100 may be configured to rotate up to 360° to facilitate loading and dumping of bulk materials carried therein. Similarly, the bucket 1202 or bulk material carrier of dump assembly 1200 may be configured to rotate up to 360° to facilitate loading and dumping of bulk materials carried therein. Of course, it will be evident that other embodiments of a vehicle may include a cabin such as cabin 102, 902, 1402 or 1502 configured to rotate up to 360° to facilitate loading and unloading of passengers or in the context of an amusement park ride cabin.

Features of the various embodiments of vehicle 100 and its various subsystems disclosed herein include self-contained "true" vehicle safety technology, i.e., "on board" drive power, both electrical and mechanical, with electrical controls and wireless connectivity to: (1) station controls, (2) safety features and (3) multiple vehicle systems. Another feature of selected embodiments of vehicle 100 is self-contained electric car technology. The vehicle 100 may be used in private, public and commercial transportation systems. One embodiment of vehicle 100 may be battery powered and does not require an electrification rail for an electrical power source. Because this embodiment of vehicle 100 is battery powered, it is capable of being recharged using "green" electrical energy sources such as solar and wind powered electricity if desired.

Embodiments of vehicle 100 may be formed of any suitable lightweight, high-strength materials consistent with the principles of the present invention. For example, aluminum, steel, titanium, magnesium, metal alloys and composite materials may be employed for lightweight structural components. Embodiments of the pinion drive rollers 220 disclosed herein may be formed of steel rollers including bearings or bushings for durability and smooth engagement with the rack on the monorail 199 (FIGS. 1A-B).

Embodiments of vehicle 100 may also employ various control systems to precisely track the position and speed of the vehicle 100 relative to the monorail 199 (FIGS. 1A-B). Such control systems may include one or more sensors for sensing the pinion drive rollers 220 and/or the rack teeth, and/or markers on the monorail 199 itself, and/or the vehicle 100 itself, for determining the precise position of the vehicle 100 anywhere along monorail 199 (FIGS. 1A-1B). The sensors may employ any known sensor technology, including magnetic, infrared, optical and the like, as known to those of ordinary skill in the art.

A simplified control system embodiment may simply measure the number, or count, of rack teeth from beginning to end with the capability of incrementing or decrementing a counter. Another more sophisticated control system embodiment may employ two counters, one each for both the rack teeth and the consecutive engagement of pinion drive rollers 220 between rack teeth. One embodiment of a sophisticated control system is referred to herein as "quadrature logic". Quadrature logic may include using one or more sensors to sense the engagement of teeth on the rack 197 by each pinion drive roller 220 and also sense the passing of each tooth on the rack 197, thereby generating a pulse count for each such event as the vehicle 100 is moving from one location to another.

Figure 7:
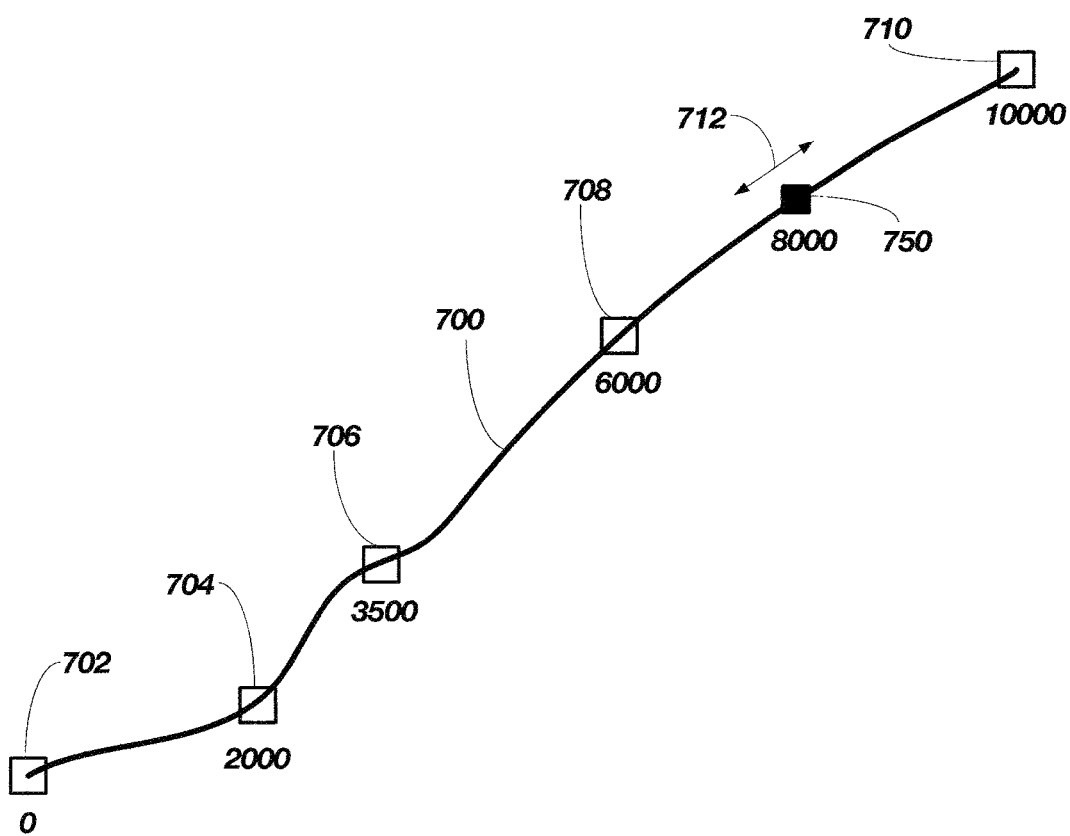
FIG. 7 is a diagram of an exemplary monorail path for use in describing an embodiment of a control system suitable for use with an embodiment of a vehicle according to the present invention.

For example and not by way of limitation, the pinion drive rollers 220 may be set as the "A" pulse count and the rack teeth as the "B" pulse count. Measuring a pulse count for each pinion drive roller 220 ("A" pulse count) and for each rack tooth ("B" pulse count) allows for a control system to determine the exact position of the pinion drive roller 220 along the rack 197. Referring now to FIG. 7, a diagram of an exemplary monorail path 700 is shown. Stations 702, 704, 706, 708 and 710 (unfilled boxes) are located along the monorail path 700 and a vehicle 750 (smaller filled black square) is shown on the monorail path 700 and can move in either direction (double-headed arrow 712) along the monorail path 700. Each station 702, 704, 706, 708 and 710 is located a given number of rack teeth along the monorail path 700 starting from the base station 702. Base station 702 may be the starting point at zero teeth and the end point station 710 may be located at a count of 10,000 teeth. So, for the example illustrated, a vehicle 750 at base station 702 may have both counts (A and B) reset to zero. The stations may be, for example, located along the monorail path 700 at counts (either A or B or both) of 2000 (station 704), 3500 (station 706), 6000 (station 708) and 10,000 (end point station 710). Thus, with either count (A or B), a quadrature control system knows precisely where along the monorail the vehicle 100 is located along the monorail path 700. As shown in FIG. 7, vehicle 750 is located at a count of 8000. Additionally, the count (A or B) going negative would indicate the vehicle 100 is traveling in the direction from the end point station 710 toward the base station 702. The quadrature logic enables the vehicle 100 to smoothly and precisely traverse the monorail 199 (FIGS. 1A-B). The quadrature logic provides precise position control, leveling control in conjunction with the tilt mechanism 110 (FIG. 1C), directional control for changing direction and engaging spurs (taking a fork) in the monorail topology. The quadrature logic also provides real time monitoring of the pinion gears to sense broken pinion drive rollers 220 or cycloid-shaped teeth of a rack 197.

The positional and speed information that may be derived from the quadrature logic may be processed by a vehicle controller that has access to additional system information for controlling the vehicle 100. Additional system information may include additional vehicle information, e.g., direction of vehicle 100 travel and current inclination or attitude. Additional system information may further include rail information, e.g., the physical layout, path length, inclination, curves, stopping points (stations) and branches (switches) of the monorail 199. All, or portions of, this information may be analyzed realtime to adjust the vehicle inclination and attitude for increased passenger comfort and safety.

The pinion drive rollers 220 of vehicle 100 are engineered to precisely and smoothly engage the cycloidal teeth of the rack 197 mounted on the monorail 199 (FIGS. 1A-B). The drive rollers 220 are formed of steel and provide a significant improvement in performance over conventional "cog wheels" or "spur gears" used in conventional cog railway systems. More particularly, the roller design of the present invention allows the roller 220 to contact the rack face, rolling a short distance, and then pivot until the next roller 220 contact is engaged. This feature under the control of quadrature logic results in smooth motion with no backlash. The pinion drive rollers 220 of the present invention also allow a margin of safe operation where there is misalignment between the rollers and the cycloid-shaped teeth of a rack 197 in any direction without adversely affecting the drive motion.

Yet another feature of vehicle 100 is a floating drive design. Because the electrical motor system 108 (FIGS. 1A-D) position is independent of the cabin 102 position (within an engineered range of misalignment), the pinion drive rollers 220 are capable of following the rack 197 of the monorail 199 (FIGS. 1A-B) independent of the cabin 102 position, resulting in a smoother ride than without the floating drive design. Additionally, the floating drive design incorporated in embodiments of the present invention allows simple removal of drive components for service and repairs.

Still another feature of vehicle 100 is dual redundant drives. The relevant industry standard for an embodiment of vehicle 100 as described herein and used with a monorail 199 is A17.1 Standard as promulgated by the American Society of Mechanical Engineers (ASME). Particularly relevant sections of the ASME A17.1 Standard are sections 5.1 and 5.4, which, among other things, require an "8×" safety factor on drive equipment. A single electrical motor having 8 times the necessary power to transport the cabin along the monorail may for some applications be prohibitively large. However, the dual redundant drives of the battery-powered electrical motor system 108 in combination with other built-in safety features can be configured to meet industry standards. Another advantage to the dual redundant drives is that it accommodates expansion joints used in the monorail 199 to compensate for thermal expansion.

Another feature of vehicle 100 is that each drive is capable of driving the cabin 102 without the other drive. The term "drive" as used herein may include a motor 310, a gearbox 306A or 306B, a brake assembly 308A or 308B and a drive sprocket assembly 208. Thus, in one embodiment, vehicle 100 is driven by a single drive with a redundant drive as a backup drive. In yet another embodiment, a single drive may be used with a transmission device (belt, chain, etc.) to a second drive roller and safety assembly. Again, it will be understood that in an alternative embodiment of the present invention, the safety and performance could be achieved with a single electric motor and power transmission method, e.g., belt, chain, etc., to the second drive assembly. This alternative embodiment includes uncompromised safety with a dual redundant over-speed safety, brake and drive engaged drive roller assembly, and the performance of reduced loads by sharing the load with the second drive roller assembly.

Yet another feature of vehicle 100 is dual redundant drive roller overrunning clutch brake safeties, also referred to herein as "safety assembly 206". This feature places a safety on the shaft between the gearbox assemblies 120A or 120B and the pinion drive rollers 220 that is capable of meeting the ASME A17.1 "8×" safety factor in lieu of sizing the gearbox assemblies 120A or 120B for the 8× safety factor.

According to another embodiment, vehicle 100 may include a simple counterweight system, such as counterweight system 1550 shown in FIGS. 15A and 15B. Embodiments of a counterweight system may employ a cable, chain or belt attached to the counterwheel assembly and routed with pulleys to the upper station in a rail system. Such pulley guided counterweight systems are known to those skilled in the art, see for example the counterweight system disclosed in U.S. Pat. No. 4,534,451 to Peter, incorporated herein by reference. The detailed implementation of such a counterweight system with the embodiments of a vehicle 100 disclosed herein would not require undue experimentation and thus, will not be further elaborated herein.

In yet other embodiments, the cable, belt or chain of a counterweight system may be supported on rack supports with a plastic anti-friction material. Exemplary racks and rack supports are shown in greater detail in U.S. patent application Ser. No. 12/075,619, see particularly FIGS. 11A-C showing rack bracket 1120, rack 1150 and related discussion therein. The use of plastic anti-friction material may be, for example and not by way of limitation, in the form of generally "U-shaped" or rounded guides mounted periodically at the rack supports to frictionally support a cable, belt or chain of a counterweight system according to such various embodiments. Particular details of implementing such embodiments of a counterweight system will be within the skill of one of ordinary skill in the art and will not require undo experimentation and, thus, will not be further elaborated herein.

In still other embodiments, the cable, belt or chain of a counterweight system may be channeled within the rail, for example the triangular cross-section of the monorail 199 shown in FIGS. 1A and 1B, allowing the vehicle 100 to pass without interference from the counterweight system. These various embodiments of a counterweight system disclosed herein and known to those of skill in the art reduce the load of the cabin 102 on the electrical motor system 108 and may allow the rail system to be placed in equilibrium (uphill force balanced against gravitational pull downhill) in certain applications. Use of such embodiments of a counterweight system may reduce drive torque requirements on the electrical motor system 108, thereby resulting in weight and cost savings in the associated gearbox assemblies 120, drive assemblies 112 and 114, drive roller assemblies and rack 197 (FIG. 1A).

According to another embodiment, vehicle 100 may include two-axis leveling to increase passenger comfort by keeping the cabin 102 level through terrain changes. The first axis of leveling relates to the cabin axle 132 and its associated tilt mechanism 110 described above which also allows pre-leveling for braking and vertical changes along the monorail path. The two-axis leveling feature also counteracts horizontal forces that act upon the cabin 102. The two-axis leveling feature may be driven by an algorithm integrated with the tilt mechanism 110 and in cooperation with the quadrature logic 812 feature described above.

The second axis of leveling relates to rotation about a centerline of the monorail 199, or "banking", that may also be used to roll or bank the cabin into curves of the monorail 199. According to some embodiments, there may be an adjustable bank depending on the spacing between support wheels of the counterwheel assembly 104 and/or the radius of a curve in the monorail 199. According to one embodiment, the banking feature may be achieved by actively shifting the separation between support wheels in the counterwheel assembly 104 towards each other or away from each other to allow the cabin 102 to tilt up or down selectively as it follows the monorail 199. The following discussion further describes this banking feature associated with various embodiments of the present invention.

FIGS. 16A-16C are perspective, top and monorail centerline views of an embodiment of a carriage assembly 1600 having two outside support wheels 1602, a centrally located inside support wheel 1604 under a platform 1606 during an outside curve according to the present invention. As shown best in FIG. 16C, platform 1606 may achieve some natural or static banking upward, that can be measured in some number of degrees clockwise from horizontal 1610 (9° as shown FIG. 16C) when traveling either direction along the monorail 1699. On a straight section of monorail 1699 (not shown), carriage assembly 1600 will have a horizontal platform 1606 with no banking. It will be understood that the 9° of banking is merely exemplary and not limiting of the invention. Various degrees of static banking on an outside curve may be achieved by selectively separating inner support wheels 1604 or by changing the radius of curvature of the turn in monorail 1699.

For example, by using two inner support wheels 1704 that are separated by the same distance as the outer support wheels 1702 are separated from each other, there may be negligible static banking effect. FIGS. 17A-17C are perspective, top and monorail centerline views of an embodiment of a carriage assembly 1700 having two outside support wheels 1702, two inside support wheels 1704 under a platform 1706 during an outside curve according to the present invention. As shown best in FIG. 17C, platform 1706 remains horizontal when traveling either direction along the monorail 1799. That is to say that on a straight section of monorail 1799 (not shown), carriage assembly 1700 will maintain a horizontal platform 1706 with no banking. The static or natural banking effect described in FIGS. 16A-16C and 17A-17C are also applicable in the reverse direction during an inside curve.

Figure 18A:
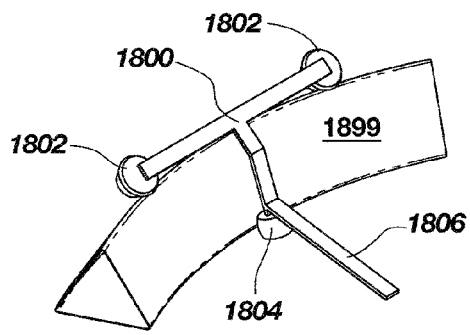
FIGS. 18A-18C are perspective, top and monorail centerline views of an embodiment of a carriage assembly having two outside support wheels, a centrally located inside support wheel under a platform during an inside curve according to the present invention.
Figure 18B:
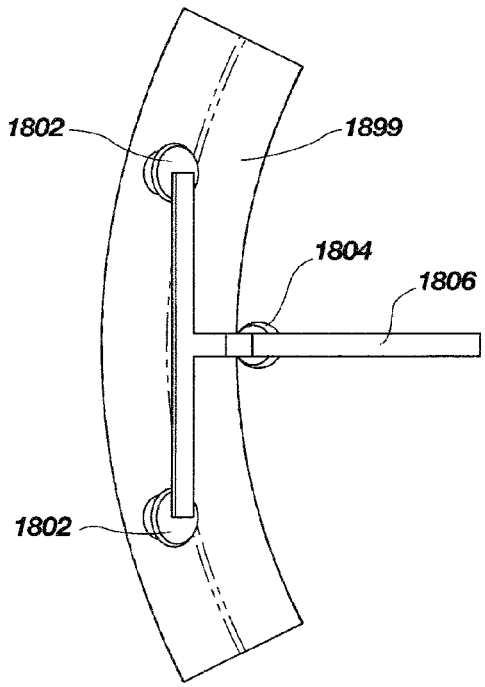
Figure 18C:
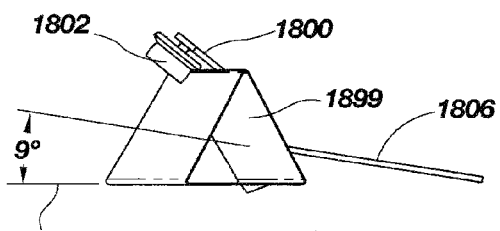

FIGS. 18A-18C are perspective, top and monorail centerline views of an embodiment of a carriage assembly 1800 having two outside support wheels 1802, a centrally located inside support wheel 1804 under a platform 1806 during an inside curve according to the present invention. As shown best in FIG. 18C, platform 1806 may achieve some natural or static banking downward, that can be measured in some number of degrees clockwise from horizontal 1910 (9° as shown FIG. 18C) when traveling either direction along the monorail 1899. On a straight section of monorail 1899 (not shown), carriage assembly 1800 will have a horizontal platform 1806 with no banking. Again, it will be understood that the 9° of banking is merely exemplary and not limiting of the invention. Various degrees of static banking on an inside curve may be achieved by selectively separating inner support wheels 1804 or by changing the radius of curvature of the turn in monorail 1899.

Figure 19A:
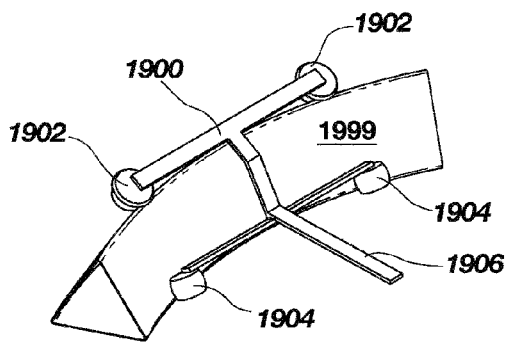
FIGS. 19A-19C are perspective, top and monorail centerline views of an embodiment of a carriage assembly having two outside support wheels, two inside support wheels under a platform during an inside curve according to the present invention.
Figure 19B:
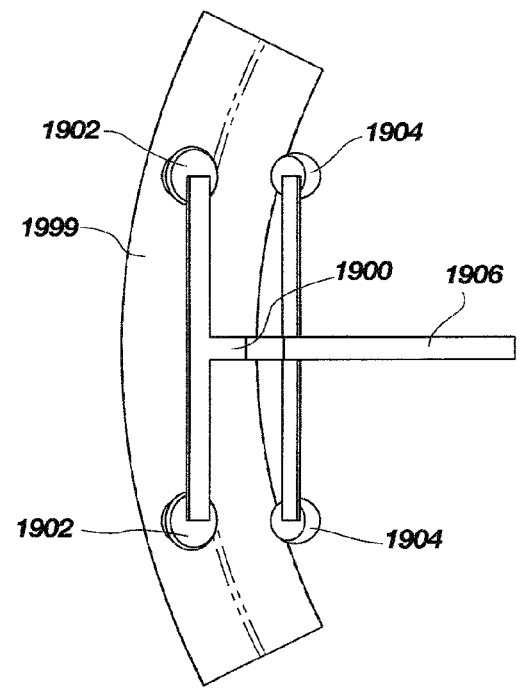
Figure 19C:
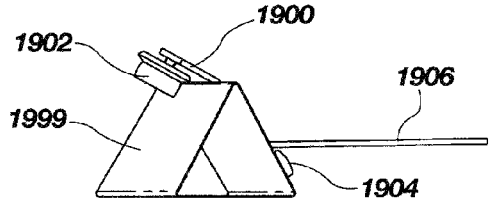

For example, by using two inner support wheels 1904 that are separated by the same distance as the outer support wheels 1902 are separated from each other, there may be negligible static banking effect. FIGS. 19A-19C are perspective, top and monorail centerline views of an embodiment of a carriage assembly 1900 having two outside support wheels 1902, two inside support wheels 1904 under a platform 1706 during an inside curve according to the present invention. As shown best in FIG. 19C, platform 1906 remains horizontal when traveling either direction along the monorail 1999. That is to say that on a straight section (not shown) of monorail 1999, carriage assembly 1900 will maintain a horizontal platform 1906 with no banking. Vehicle 100 exhibits this natural banking feature to a small degree because support wheels on cabin cartridges 134A are just inboard of the separation of support wheels 131, see FIG. 1D.

According to yet another embodiment, vehicle 100 may be used as an amusement ride vehicle by allowing the cabin 102 to be rotated up to 360° in either direction as a thrill ride. In still another embodiment, vehicle 100 may be used as a cargo hopper that can be rotated to facilitate loading and unloading operations, see for example the cantilever dump assembly 1100 (FIG. 11 and related discussion above) or dump assembly 1200 (FIG. 12 and related discussion above).

According to still further embodiments, vehicle 100 may be used with a second monorail (not shown) to support larger capacity loads of a cantilevered cabin 100, but leaving the traction drive unit (e.g., battery-powered electrical motor system 108) and leveling controls to operate from one track or monorail 199 only. Such a larger capacity load system would use the second track or monorail 199 for load support only. In still other embodiments, the second track or monorail 199 may also employ a drive traction unit where the load requires the additional power.

According to yet further embodiments, vehicle 100 may be used on tracks that include loops and spurs for monorail systems having various topologies. According to other embodiments, multiple vehicles could be operated on a single monorail system which has loops and spurs. According to other embodiments, individual vehicles 100 could operate independently in opposite directions on the same track or monorail 199 depending on the destination and efficiency of the system.

Another feature of vehicle 100 is that it can be used as a safety evacuation vehicle. Because vehicle 100 is a true vehicle, it can be used for evacuation of other vehicles on the monorail, which have become stranded on the same track. Additionally, vehicle 100 may be used to tow a disabled vehicle 100 to a maintenance area.

Another feature of vehicle 100 is that it may be used as a construction vehicle during the installation of the monorail. Because vehicle 100 is self-driven, it may be used to carry a jib boom for concrete and track (monorail) installation, it has the capacity to carry multiple sections of track and has wireless controls. In yet another embodiment, the vehicle 100 may be a special purpose vehicle used for construction along its length for housing industrial devices and carrying materials, etc. with a construction-type cargo platform (not shown) in lieu of a cabin 102. Once the monorail 199 is completed, the construction-type cargo platform is replaced with the cabin 102 intended for end use. In yet another embodiment, a towable trailer can be used with a construction-type cargo platform or cabin 102 to be used in construction, freight, or industrial applications.

The potential market for vehicle 100 as described herein includes: people movers, hybrid elevator loop systems, transportation of skiers and boarders at ski resorts, passenger transportation between beaches or lake fronts and dwellings located on a cliff or hill above the water, transportation of golfers and golf bags at golf courses, amusement ride vehicles, various residential and commercial passenger transportations, industrial systems as conveyors in mining, transportation at radar and antenna sites, transportation in vertical and incline freight applications, site access transportation, handicapped and/or restricted access to homes, commercial buildings national and state parks and commercial centers and towing of other vehicles along the monorail. Of course, other relevant applications for the technology will be readily apparent to one of skill in the art and are within the scope of the present invention.

While the foregoing advantages of the present invention are manifested in the detailed description and illustrated embodiments of the invention, a variety of changes can be made to the configuration, design and construction of the invention to achieve those advantages. For example and not by way of limitation, cabin size, orientation of the monorail 199, configuration of vehicle mounting to the monorail 199, and the scale of the components may be varied to accommodate any particular capacity design. Additionally, control systems for multiple cars (cabins) with multiple stations and looped or spurred monorail configurations are also contemplated embodiments of the present invention. All of those variations and alternative embodiments are considered to be within the scope of the present invention. Hence, reference herein to specific details of the structure and function of the present invention is by way of example only and not by way of limitation.

What is claimed is:

1. A vehicle for transporting a payload along a monorail, comprising:
   a cabin configured for carrying the payload;
   a counterwheel assembly configured for wheeled engagement around the monorail;
   a platform assembly configured for supporting the cabin, and further comprising a cabin axle rotationally connected to the counterwheel assembly;
   a leveling control system attached to the platform assembly and in rotational communication with the cabin axle; and
   a motor system comprising dual redundant electrical motors mounted to the counterwheel assembly for driving the vehicle along the monorail.

2. The vehicle according to claim 1, wherein the leveling control system further comprises a tilt mechanism in communication with the platform assembly for selectively rotating the cabin about the cabin axle.

3. The vehicle according to claim 2, wherein the tilt mechanism is configured for leveling the cabin by selectively rotating the cabin during changes in monorail inclination.

4. The vehicle according to claim 3, wherein the selective rotation of the cabin ranges up to about 50 degrees of angular rotation.

5. The vehicle according to claim 2, wherein the tilt mechanism is configured for pre-leveling the cabin to counteract changes in cabin horizontal force.

6. The vehicle according to claim 2, wherein the tilt mechanism further comprises at least one of electric, hydraulic or pneumatic actuators.

7. The vehicle according to claim 6, wherein the at least one actuator is in communication with a tilt arm of the platform assembly.

8. The vehicle according to claim 1, wherein the leveling control system is configured for receiving and processing information for selectively rotating the cabin, the information comprising at least one of: vehicle location along the monorail, monorail inclination, vehicle speed, vehicle direction and current vehicle rotation.

9. The vehicle according to claim 1, wherein the leveling control system comprises a computer in communication with sensors for speed, location and direction of the cabin, the computer configured to drive actuators for leveling or pre-leveling the cabin by selective rotation of the cabin about the cabin axle.

10. The vehicle according to claim 1, wherein the cabin is cantilevered to the side of the monorail.

11. The vehicle according to claim 1, wherein the cabin is placed substantially above the monorail.

12. The vehicle according to claim 1, wherein the cabin comprises a personnel carrier and the payload comprises passengers.

13. The vehicle according to claim 1, wherein the cabin comprises a bulk material carrier.

14. The vehicle according to claim 11, wherein the cabin is further configured to rotate up to 360° to facilitate loading and dumping of bulk materials.

15. The vehicle according to claim 1, wherein the motor system comprises a battery-powered electrical motor.

16. The vehicle according to claim 1, wherein the motor system further comprises a drive sprocket assembly with pinion drive rollers for engaging teeth of a rack mounted along the monorail.

17. The vehicle according to claim 16, wherein the teeth of the rack are cycloid-shaped.

18. The vehicle according to claim 1, wherein each of the dual redundant electrical motors is configured for rotating a drive sprocket assembly including pinion drive rollers further configured for engaging cycloid-shaped teeth of a rack mounted along the monorail.

19. A vehicle for transporting a payload along a monorail, comprising:
   a cabin configured for carrying the payload;
   a counterwheel assembly configured for wheeled engagement around the monorail;

a platform assembly configured for supporting the cabin, and further comprising a cabin axle rotationally connected to the counterwheel assembly; and a motor system mounted to the counterwheel assembly for driving the vehicle along the monorail, the motor system further comprising a safety assembly configured for bringing the vehicle to a controlled stop during a overspeed condition.

20. The vehicle according to claim 19, wherein the safety assembly comprises teeth for engaging a fixed stop thereby engaging a torque limiter to slow drive shaft rotation to a stop.

21. A vehicle for transporting a payload along a monorail, comprising:

a cabin configured for carrying the payload;

a counterwheel assembly configured for wheeled engagement around the monorail;

a platform assembly configured for supporting the cabin, and further comprising a cabin axle rotationally connected to the counterwheel assembly;

a motor system mounted to the counterwheel assembly for driving the vehicle along the monorail; and a counterweight system attached to the counterwheel assembly, the counterweight system adapted to reduce drive torque required of the motor system.

22. A vehicle for transporting a payload along a monorail, comprising:

a cabin configured for carrying the payload;

a counterwheel assembly configured for wheeled engagement around the monorail;

a platform assembly configured for supporting the cabin, and further comprising a cabin axle rotationally connected to the counterwheel assembly;

a motor system mounted to the counterwheel assembly for driving the vehicle along the monorail; and wherein the monorail is triangular in cross-section.

23. A vehicle for transporting a payload along a monorail, comprising:

a cabin configured for carrying the payload;

a counterwheel assembly configured for wheeled engagement around the monorail;

a platform assembly configured for supporting the cabin, and further comprising a cabin axle rotationally connected to the counterwheel assembly; and a motor system mounted to the counterwheel assembly for driving the vehicle along the monorail, the motor system further comprising at least one safety assembly that automatically slows the vehicle to a stop during an overspeed condition in either direction of travel.

* * * * *